US012521295B2

United States Patent
Pinnock et al.

(10) Patent No.: US 12,521,295 B2
(45) Date of Patent: Jan. 13, 2026

(54) ACTIVE-PASSIVE ROBOTIC EXOSKELETON SYSTEMS, APPENDAGE AND JOINT UNITS, MODULAR MOTOR UNITS, AND METHODS FOR MAKING THE SAME

(71) Applicant: Motion Augmented LLC, Farmington Hills, MI (US)

(72) Inventors: Cameron Brandon Pinnock, Farmington, MI (US); Haroun Algahmi, Detroit, MI (US)

(73) Assignee: Motion Augmented LLC, Farmington Hills, MI (US)

( * ) Notice: Subject to any disclaimer, the term of this patent is extended or adjusted under 35 U.S.C. 154(b) by 402 days.

(21) Appl. No.: 18/181,637

(22) Filed: Mar. 10, 2023

(65) Prior Publication Data

US 2024/0074935 A1 Mar. 7, 2024

Related U.S. Application Data

(60) Provisional application No. 63/418,135, filed on Oct. 21, 2022, provisional application No. 63/403,425, filed on Sep. 2, 2022.

(51) Int. Cl.
*B25J 9/00* (2006.01)
*A61H 1/00* (2006.01)
(Continued)

(52) U.S. Cl.
CPC ........... *A61H 1/0255* (2013.01); *A61H 1/008* (2013.01); *A61H 1/024* (2013.01); *A61H 1/0266* (2013.01);
(Continued)

(58) Field of Classification Search
CPC ........ F16D 27/09; F16D 27/118; F16D 11/14; B25J 9/102; B25J 9/1025; B25J 9/103;
(Continued)

(56) References Cited

U.S. PATENT DOCUMENTS

| 4,517,853 A | * | 5/1985 | Tani | B25J 9/041 |
| | | | | 74/89.32 |
| 4,592,697 A | * | 6/1986 | Tuda | B25J 19/0016 |
| | | | | 267/71 |

(Continued)

FOREIGN PATENT DOCUMENTS

| CN | 107662222 A | * | 2/2018 | ......... B25J 17/0258 |
| CN | 108032329 A | * | 5/2018 | ......... B25J 17/0283 |

(Continued)

OTHER PUBLICATIONS

Christopher Nesler, Gray Thomas, Nikhil Divekar, Elliot J. Rouse, and Robert D. Gregg, "Enhancing Voluntary Motion with Modular, Backdrivable, Powered Hip and Knee Orthoses", IEEE Robotics and Automation Letters, Jan. 2, 2022, pp. 1-8.

*Primary Examiner* — James J Taylor, II
(74) *Attorney, Agent, or Firm* — Quinn IP Law

(57) ABSTRACT

A modular passive-to-active exoskeleton system utilizes motor unit modules, an electromagnetic-clutch power transmission system, and biometric control. The passive exoskeleton has a stamina-increasing "chairless chair" function and optional use of magnetic ball-and-socket joints and knee torsion springs. To convert the exoskeleton system into an active robotic wearable device, modular attachments allow for motor units to be securely connected to the exoskeletal frame. An exoskeleton system may contain a knee motor unit that has a transmission system with an electromagnetic clutch that enables a passive mode, active mode, and/or hybrid mode. The motor units are controlled using wireless biometric motion sensors that measure limb joint angle and (Continued)

muscle activity. These motor units also communicate via wireless transmission with a central processing unit of the exoskeleton. This central processing unit serves as a gateway for user feedback from an Internet-of-Things (IoT) device, such as a smartphone, tablet, computer, etc.

20 Claims, 15 Drawing Sheets

(51) Int. Cl.
*A61H 1/02* (2006.01)
*A61H 3/00* (2006.01)
*A63B 24/00* (2006.01)
*B25J 9/10* (2006.01)
*B25J 9/12* (2006.01)
*B25J 17/00* (2006.01)
*F16D 27/09* (2006.01)

(52) U.S. Cl.
CPC ......... *A61H 1/0274* (2013.01); *A61H 1/0277* (2013.01); *A61H 1/0281* (2013.01); *A61H 3/00* (2013.01); *A63B 24/0006* (2013.01); *A63B 24/0062* (2013.01); *B25J 9/0006* (2013.01); *B25J 17/00* (2013.01); *A61G 2203/10* (2013.01); *A61H 2003/007* (2013.01); *A61H 2201/1207* (2013.01); *A61H 2201/1215* (2013.01); *A61H 2201/1276* (2013.01); *A61H 2201/1445* (2013.01); *A61H 2201/1472* (2013.01); *A61H 2201/1614* (2013.01); *A61H 2201/1619* (2013.01); *A61H 2201/1628* (2013.01); *A61H 2201/1635* (2013.01); *A61H 2201/164* (2013.01); *A61H 2201/165* (2013.01); *A61H 2201/1652* (2013.01); *A61H 2201/1673* (2013.01); *A61H 2201/5007* (2013.01); *A61H 2201/503* (2013.01); *A61H 2201/5064* (2013.01); *A61H 2201/5069* (2013.01); *A61H 2201/5097* (2013.01); *A61H 2203/0406* (2013.01); *A61H 2203/0418* (2013.01); *A61H 2230/00* (2013.01); *A61H 2230/605* (2013.01); *A63B 2220/803* (2013.01); *A63B 2220/836* (2013.01); *A63B 2225/20* (2013.01); *A63B 2225/50* (2013.01); *B25J 9/102* (2013.01); *B25J 9/1025* (2013.01); *B25J 9/126* (2013.01); *F16D 27/09* (2013.01)

(58) Field of Classification Search
CPC ....... B25J 9/126; A61H 2201/12–1223; A61H 2201/14–1472; A61H 2201/1671–1673; A61H 2201/1676–1678; A61H 2201/5053
See application file for complete search history.

(56) References Cited

U.S. PATENT DOCUMENTS

| | | | |
|---|---|---|---|
| 7,190,141 | B1 | 3/2007 | Ashrafiuon et al. |
| 7,774,177 | B2 | 8/2010 | Dariush |
| 7,947,004 | B2 | 5/2011 | Kazerooni et al. |
| 8,057,410 | B2 | 11/2011 | Angold et al. |
| 8,316,719 | B2 | 11/2012 | Majidi et al. |
| 9,351,900 | B2 | 5/2016 | Walsh et al. |
| 9,841,331 | B2 | 12/2017 | Wood et al. |
| 10,342,723 | B2 | 7/2019 | Julin |
| 10,350,130 | B2 | 7/2019 | Hughes et al. |
| 10,470,671 | B2 | 11/2019 | Braun et al. |
| 10,583,551 | B2 | 3/2020 | Angold et al. |
| 10,702,441 | B2 | 7/2020 | Julin et al. |
| 11,673,253 | B2 | 6/2023 | Julin |
| 12,240,321 | B2 * | 3/2025 | Milacic ............. F16H 48/08 |
| 2007/0123997 | A1 | 5/2007 | Herr et al. |
| 2009/0325739 | A1 | 12/2009 | Gold |
| 2011/0105966 | A1 | 5/2011 | Kazerooni et al. |
| 2011/0245738 | A1 | 10/2011 | Agrawal et al. |
| 2012/0108394 | A1 | 5/2012 | Jones et al. |
| 2012/0179075 | A1 | 7/2012 | Perry et al. |
| 2013/0253385 | A1 | 9/2013 | Goffer et al. |
| 2014/0248594 | A1 | 9/2014 | Navas |
| 2014/0372440 | A1 | 12/2014 | Cains |
| 2015/0182810 | A1 | 7/2015 | Thurman et al. |
| 2015/0351995 | A1 | 12/2015 | Zoss et al. |
| 2017/0144309 | A1 | 5/2017 | Sankai |
| 2019/0251238 | A1 | 8/2019 | Venkatraman |
| 2020/0178895 | A1 | 6/2020 | Lu et al. |
| 2023/0218464 | A1 | 7/2023 | Wabg et al. |

FOREIGN PATENT DOCUMENTS

| | | | | |
|---|---|---|---|---|
| DE | 3504233 | A1 * | 11/1986 | |
| EP | 0060483 | A1 * | 9/1982 | ............ B25J 9/1025 |
| WO | 2016044251 | A1 | 3/2016 | |

* cited by examiner

ACTIVE-PASSIVE ROBOTIC EXOSKELETON SYSTEMS, APPENDAGE AND JOINT UNITS, MODULAR MOTOR UNITS, AND METHODS FOR MAKING THE SAME

CLAIM OF PRIORITY AND CROSS-REFERENCE TO RELATED APPLICATIONS

This application claims the benefit of and priority to U.S. Provisional Patent Application No. 63/403,425, which was filed on Sep. 2, 2022, and U.S. Provisional Patent Application No. 63/418,135, which was filed on Oct. 21, 2022, both of which are incorporated herein by reference in their respective entireties and for all purposes.

TECHNICAL FIELD

The present disclosure relates generally to wearable devices and systems for assisting with user motion. More specifically, aspects of this disclosure relate to passive and active exoskeleton systems for assisting human motion and reducing energy expenditure during motion.

BACKGROUND

Many exoskeletons on the market are used in medical rehabilitation and industrial applications that require heavy lifting or other atypical dynamic movements. The exoskeletons in both of these applications typically do not incorporate features that allow the wearers to use their own natural strength while healing or to quicky escape from danger while on the job. Even though a reason for using exoskeletons in this manner is to assist the wearer, the user may eventually wish to rely on their own strength without supplemental assistance, e.g., via an exoskeletal electric motor. Many applications may be directed to rehabilitation of minor injuries and for uninjured individuals that are using the exoskeleton system to conserve energy while doing tasks. In such applications, having the ability to walk or lift with assistance via a motor and, when desired, run or move freely without motor-assistance may be crucial in the engineering of an exoskeleton suit.

Exoskeletons may be controlled using a variety of different methods. For instance, an exoskeleton may be controlled autonomously via computer programmed software (e.g., in instances where the user is paralyzed from the waist down). Another method includes using walking sticks that have force sensors or motion sensors that work in cadence with the exoskeleton robot. In an example, electromyograph (EMG) and electroencephalograph (EEG) sensors may be employed to control the exoskeleton systems (e.g., for users that are partially or completely paralyzed from the waist down). Additionally, motion sensors may be employed to measure joint angles to aid in providing direction for the exoskeleton. Available types of biometric sensors that may be utilized in exoskeleton systems include, for example, motion joint angle sensors worn on the user's body, force sensors worn on the hands and feet, EMG sensors, and EEG sensors. However, many commercially available biometric sensors are costly, cumbersome, and/or contain many wires that complicate system assembly and can be inconvenient for the end user.

Exoskeleton technology has been in use experimentally since the mid-20th century and has since gained much traction. An example of a "Reconfigurable Exoskeleton" is presented in U.S. Patent App. Pub. No. 2015/0351995 A1, to Adam Zoss et al., which utilizes a modular joint system to enable reconfigurable exoskeleton limbs. The Zoss exoskeleton is a powered exoskeleton system that allows for limb actuation at the joints for assistance during walking. Even though this device is less bulky than many other available exoskeletons, it moves slowly and is only meant for rehabilitation purposes for individuals with lower extremity paralysis. Users are not able to run with the Zoss exoskeleton nor are they able to move with the system power off.

An example of a "Motorized Exoskeleton Unit" is shown in U.S. Patent App. Pub. No. 2013/0253385 A1, to Amit Goffer et al., which is designed for a lower body extremity. In this example, the exoskeleton's joints are motorized to allow for actuation of the limbs. Goffer's device is designed to assist someone while walking and for related bipedal locomotion. In addition, this device contains a motor that is only connected to a lower limb and does not contain a clutching mechanism to allow the individual the freedom to move on their own.

An example of a robotic "Wearing-Type Movement Assistance Device" is shown in U.S. Patent App. Pub. No. 2017/0144309 A1, to Yoshiyuki Sankai, which uses drive units to provision lift assistance using angle joint sensors to control the exoskeleton. Sankai's exoskeleton includes an upper limb assistance section jointed to a lower limb assistance section with motorized hip, shoulder, and elbow joints to aid someone while performing tasks. However, the exoskeleton drive motors in this design are permanent fixtures and, thus, are not readily attachable and removable by the end user. In addition, Sankai's sensors are not wireless and the exoskeleton system is not modular.

None of the above-described exoskeleton examples are hybrid passive-and-active robotic exoskeletons in which the end user can readily add and remove motor units or selectively engage and disengage the motor units when desired. Additionally, none of the above motorized exoskeleton examples utilize a clutch device for the selective transmission of power from the motor to actuate a limb to enhance the user's strength, nor are they being controlled via wireless sensor technology. All of the above discussed U.S. Patents and Patent Application Publications are incorporated herein by reference in their respective entireties and for all purposes.

SUMMARY

Presented herein are exoskeleton systems with attendant control logic for assisting users with movement, power clutch transmissions for exoskeletons, articulating joint and appendage units for exoskeletons, modular motor units for exoskeletons, wireless biometric controls systems for exoskeletons, and methods for making and methods for operating disclosed exoskeletons, transmissions, motor units, appendage-joint assemblies, and/or biometric systems. In an example, there is presented a modular exoskeleton adaptable with modular motor unit attachments that increase a user's strength when electrically powered. When not powered, the exoskeleton is in a passive operating mode that allows the user to freely move without assistance. The user can detach the motor units and customize the passive exoskeleton to multiple different architectures. Disclosed exoskeleton systems may employ Internet of Things (IoT) technology, e.g., that uses Bluetooth Low Energy technology (BLE), to connect biometric sensors to a central processing unit (CPU) of the exoskeleton and, if desired, to other resident system devices.

Aspects of this disclosure are also directed to hybrid power clutch transmission devices, e.g., for an elbow/knee motor unit, a hip/shoulder motor unit, and/or other motorized limb units of an exoskeleton system. The hybrid transmission and attendant control scheme is enabled via one or more electromagnetic clutches that engage and take up torque capacity when powered to thereby initiate a strength-enhancing active operating mode of the exoskeleton system. When not powered, the electromagnetic clutch or clutches disengage and slip to enable a passive operating mode of the exoskeleton system. An optional hybrid operating mode may default to a passive-type operating mode and automatically trigger an active-type operating mode when wireless biometric sensors activate clutch engagement when increased muscle activity is predicted or sensed.

The weight-bearing structure of the exoskeleton system may include an exoskeleton frame, which may contain an upper body mechanical structure and/or a lower body mechanical structure. The exoskeleton frame may use high-strength magnetic ball-and-socket joints for the hip and shoulder joint regions, e.g., to increase range of motion via mimicking the same regions of the human body. A knee region of the exoskeleton frame structure may be spring loaded, e.g., via a torsion spring and/or a gas spring. A leg region of the exoskeleton frame structure may contain a magnetic sliding lock mechanism that can be used to lock a gas spring when disengaged; when engaged, the sliding lock mechanism may unlock the gas spring such that the user can bend their knee. The sliding lock mechanism may allow the wearer to hold a desired position without the associated motor(s) being powered.

The exoskeleton frame structure may be made active, at least in part, via the attachment of one or more computer-controlled motor units. When powered on, these motor units supplement user strength for the wearer of the exoskeleton system. Output of the motorized units may be governed by a system central processing unit (CPU) based on feedback from a distributed network of wireless biometric sensors. Biometric sensors that are used to control the exoskeleton system may include motion sensors for detecting angle positioning and EMG sensors for detecting muscle activity. A modular exoskeleton architecture that is designed to add one or more motor unit modules to enable an active robotic exoskeleton provides multiple uses for the wearer as well as various economic benefits. When set in a passive operating mode, the exoskeleton frame structure may provide the user with the ability to stand or hold a squatting position, e.g., via mechanically locking parts of the exoskeleton. When set in an active operating mode, a user can add one or more motor units to aid in augmenting the wearer's strength capabilities. This enables a user to purchase/integrate only what is needed, and to modify the exoskeletal functionality at any time, rather than being limited to buying/using either a passive exoskeleton or a robotic exoskeleton.

Disclosed motorized exoskeleton systems may contain one or more articulating joint assemblies, such as a knee module, each which may be equipped with an electromagnetic clutch, e.g., for safety, increased freedom of movement, and decreased battery power consumption. Safety is a top priority for many applications when designing exoskeletons. For instance, the user will be protected from injury if a CPU error occurs because the system is able to decouple the motor from the limb. Also, the motor and the gears will be protected from damage if an error occurs. Increased freedom of movement may enable improved safety since disengaging the electromagnetic clutch or clutches enables the user to move without hinderance at their own speed and under their own control, e.g., to escape danger or to work faster. Unlike many commercially available motorized exoskeletons, in which the user can only move as fast as the exoskeleton motor allows them to move, disclosed exoskeleton systems help to enable both active and passive operation for unencumbered movement. Moreover, the ability to drivingly decouple the motor units reduces motor use with a concomitant reduction in energy consumption and wear; in so doing, the user can activate the exoskeleton system's assisted walking and lifting features when desired.

Attendant advantages for at least some of the disclosed concepts include modular motor unit designs that are structurally configured to be easily attached to an exoskeleton suit, providing an active exoskeleton architecture that enables assisted movement with enhanced strength via robotic actuation. At the same time, disclosed modular motor units are structurally configured to be easily detached from an exoskeleton suit, providing a passive exoskeleton architecture that enables the user to rely on their own strength and stamina, e.g., with the enhanced stability provided by the suit. To simplify motor attachment/detachment while reducing system cost, weight, and complexity, disclosed motor units may communicate wirelessly with on-board controllers and sensors. The modularity and interchangeability of the motor unit modules further reduces system complexity and manufacturing costs while optimizing cross-platform adaptability and improving end-user experience.

Aspects of this disclosure are directed to modular motor units for exoskeleton systems, including a full-body or partial-body exoskeleton ("exo") frame with one or more joint assemblies that each attaches to an appendage of a user. In an example, a motor unit includes a motor support structure with one or more interconnected motor plates that attach to an exo-frame joint assembly. An electric motor is attached to the motor support structure and controller-regulated to produce a motor output torque, e.g., to boost or automate motion of the joint assembly. A motor attachment device, which may be in the nature of a disc-shaped connecting hub, is selectively connectable to the electric motor, e.g., via gear train and clutch system, and designed to drivingly connect to the joint assembly and transmit thereto the motor's output torque. An electromagnetic (EM) clutch assembly is attached to the motor support structure in serial power-flow communication between the electric motor and the motor attachment device (i.e., motor output torque passes through the EM clutch then the attachment device to the joint assembly). When actuated, the EM clutch assembly drivingly connects the electric motor to the motor attachment device and thereby transmits the motor output torque to the joint assembly.

Additional aspects of this disclosure are directed to hybrid active-passive exoskeleton systems for assisting the movement of a user. As used herein, the terms "exoskeleton" and "exoskeleton system", including permutations thereof, may be used interchangeably and synonymously to include any relevant exoskeleton platform, such as: medical exoskeletons, industrial exoskeletons, and combat exoskeletons; passive-type, active-type, and hybrid-type exoskeletons; fixed architectures, supported architectures, and mobile architectures; soft-suit and hard-suite designs; and full-body, lower-extremity, and upper-extremity exoskeletons, etc. In an example, an exoskeleton system includes an exoskeleton frame with at least one articulating joint and appendage assembly that attaches to an appendage of a user.

Continuing with the preceding discussion, the exoskeleton system also includes one or more modular motor units that removably attach to the exoskeleton joint assembly/assemblies. Each motor unit includes a rigid motor support structure with a motor plate that is removably mounted, e.g., via threaded fasteners, to an exo joint assembly. Mounted to the motor support structure is an electric motor that is operable to produce a desired motor output torque at a desired motor speed to facilitate operation of the joint assembly. A motor attachment device is selectively connectable to the electric motor and drivingly connected to an articulating joint of the joint assembly to transmit thereto motor torque received from the electric motor. An EM clutch assembly is mounted to the motor support structure in serial power-flow communication between the electric motor and the motor attachment device. The EM clutch assembly is selectively actuable, e.g., via a human-machine interface (HMI) and system central processing unit, to drivingly connect the electric motor to the motor attachment device and thereby transmit motor output torque to the joint assembly.

Aspects of this disclosure are also directed to manufacturing workflow processes, computer-readable media, and control logic for making or for using any of the disclosed exoskeleton systems, modular motor unit assemblies, biometric sensor arrays, and/or other disclosed hardware and componentry. In an example, a method is presented for assembling a motor unit for an exoskeleton system. The exoskeleton system includes an exoskeleton frame with a joint assembly configured to attach to an appendage of a user. This representative method includes, in any order and in any combination with any of the above and below disclosed options and features: assembling a motor support structure with a motor plate configured to mount to the joint assembly; attaching an electric motor to the motor support structure, the electric motor being operable to produce a motor output torque; attaching, in a selectively connectable manner, a motor attachment device to the electric motor, the motor attachment device being configured to drivingly connect to the joint assembly and transmit thereto the motor output torque received from the electric motor; and attaching an electromagnetic (EM) clutch assembly to the motor support structure in serial power-flow communication between the electric motor and the motor attachment device, the EM clutch assembly being selectively actuable to drivingly connect the electric motor to the motor attachment device and thereby transmit the motor output torque to the joint assembly.

For any of the disclosed systems, methods, and devices, the EM clutch assembly may include an EM clutch hub that is coaxial with and reciprocally translatable towards and away from an EM clutch rotor. In this instance, the EM clutch rotor is drivingly connected to the electric motor, e.g., via harmonic drive and gear train, whereas the EM clutch hub is drivingly connected to the motor attachment device, e.g., via internal output shaft extending through the center of the EM clutch assembly. As another option, the EM clutch assembly may include an electrically conductive EM clutch coil that receives an activating electric current and responsively generates an electromagnetic field that causes the EM clutch hub to translate towards the EM clutch rotor. In this instance, the EM clutch rotor includes a first set of axially projecting gear teeth, and the EM clutch hub includes a second set of axially projecting gear teeth that contact and intermesh with the first set of gear teeth upon actuation of the EM clutch assembly. As another option, the clutch rotor and clutch hub of the EM clutch assembly rotate on a first axis, whereas a motor shaft of the electric motor rotates on a second axis, which is spaced from and substantially parallel to the first axis.

For any of the disclosed systems, methods, and devices, the motor unit may include a motor-driven drive gear that is drivingly connected to the electric motor, and a motor-torque transmitting idler gear that is drivingly connected to the EM clutch assembly. In this instance the idler gear is meshingly engaged with the driven gear in serial power-flow communication between the electric motor and the EM clutch assembly (i.e., motor output torque passes through the driven gear then the idler gear to the clutch assembly). As a further option, the idler gear is fixedly attached to the EM clutch rotor (e.g., via threaded fasteners) to coaxially rotate in unison therewith on a first axis, whereas the driven gear is rotatably attached to the electric motor's output shaft (e.g., via harmonic drive and gear separator) to coaxially rotate in unison therewith on a second axis, which is spaced from and substantially parallel to the first axis.

For any of the disclosed systems, methods, and devices, a harmonic drive unit may be drivingly connected to the electric motor in serial power-flow communication between the electric motor and the EM clutch assembly (i.e., motor output torque passes through the harmonic drive unit then a gear train to the clutch assembly). The harmonic drive unit is operable to modify motor output torque and/or motor output speed of the electric motor. As another option, a first (spur) gear may be drivingly connected to the harmonic drive unit, and a second (spur) gear may be rotatably attached to the motor support structure and meshingly engaged with the first gear. In this instance, a rotational position encoder is operatively connected to the second gear and operable to determine therefrom a rotational position of the electric motor. In yet another option, the electric motor may be directly drivingly connected to the harmonic drive unit, the harmonic drive unit may be directly drivingly connected to the first gear, the first gear may be directly drivingly connected to a gear spacer, and the gear spacer may be directly drivingly connected to a driven (helical) gear that is connected to the EM clutch assembly via an idler (helical) gear.

For any of the disclosed systems, methods, and devices, the motor support structure may include a first motor plate that is rigidly attached to a second motor plate. In this instance, the first motor plate may be structurally configured to mount onto an exo joint assembly, whereas the second motor plate may be structurally configured to mount thereon the electric motor, the EM clutch assembly, the harmonic drive unit, and driven and idler gears, etc. As a further option, the motor support structure may include a third motor plate that is interposed between and rigidly attaches the first motor plate to the second motor plate such that the first and second motor plates are substantially parallel to each other and substantially orthogonal to the third motor plate. The modular motor unit may also include a pair of L-shaped rails, each of which has a respective first end that is rigidly attached to and abuts the first motor plate and a respective second end that is rigidly attached to the second motor plate. An optional motor unit housing may be rigidly attached to the motor support structure; this housing may contain at least the EM clutch assembly.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
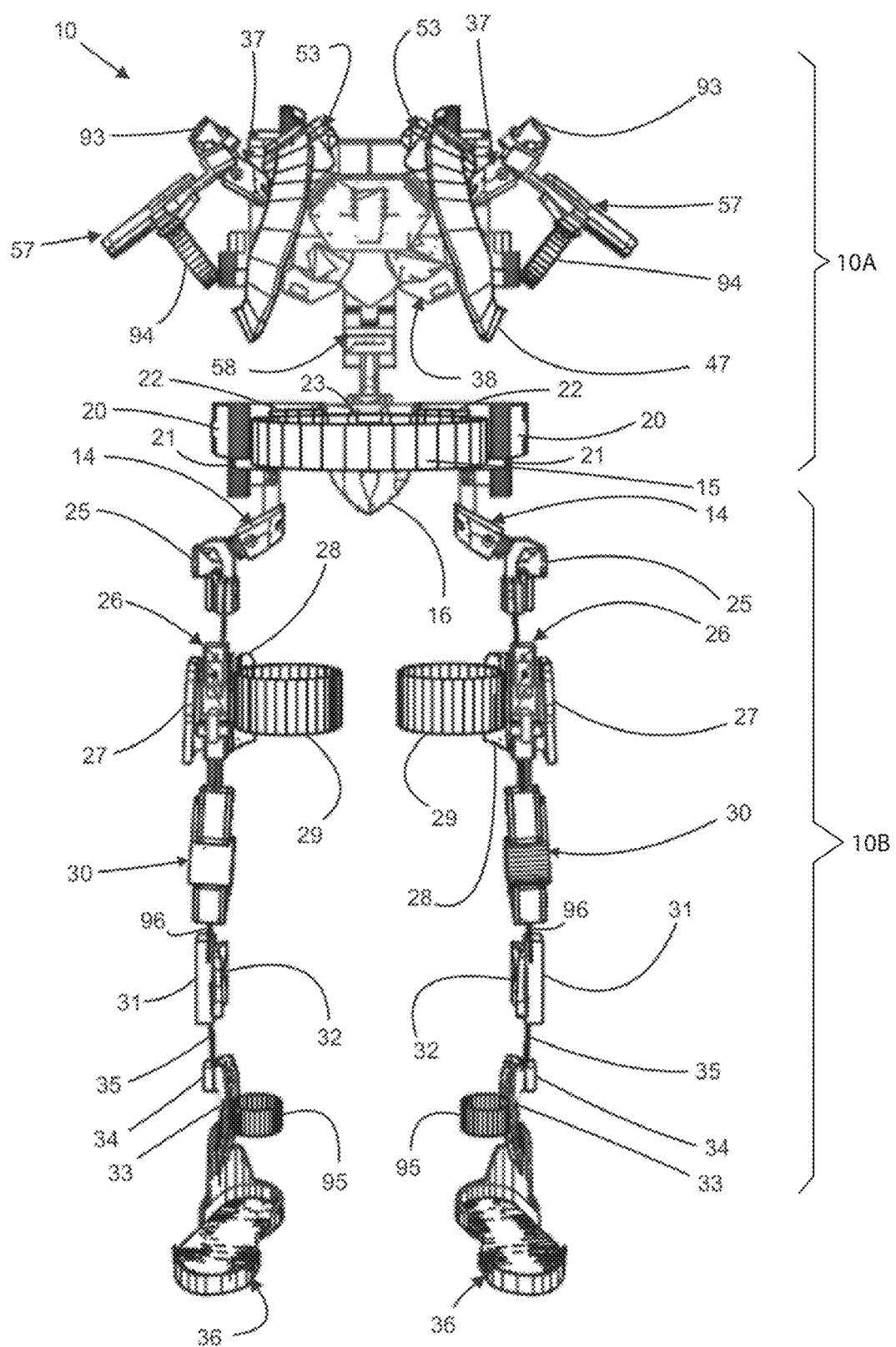
FIG. 1 is a front, perspective-view illustration of a representative full-body modular exoskeleton system without motor unit modules in accord with aspects of this disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as exemplifications of the disclosed principles, not limitations of the broad aspects of the disclosure. To that extent, elements and limitations that are described, for example, in the Abstract, Technical Field, Background, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Referring now to the drawings, wherein like reference numbers refer to the same or similar features throughout the several views, there is shown in FIG. 1 a representative exoskeleton system, which is designated generally at 10 and portrayed herein for purposes of discussion as a modular, hybrid-type full-body exoskeleton structure for an "average" adult human. The illustrated full-body exoskeleton system 10—also referred to herein as "exoskeleton structure" or "exoskeleton" for short—is merely an exemplary application with which novel aspects of this disclosure may be practiced. As such, it will be understood that aspects and features of this disclosure may be implemented for any desired exoskeleton application (e.g., industrial, commercial, medicinal, combat, etc.), may be scaled and adapted for users of different sizes, shapes, and species, and may be incorporated into any logically relevant type of exoskeleton architecture (e.g., full-body, lower-extremity, upper-extremity, etc.). Moreover, only select components of the exoskeleton systems and attendant subassemblies are shown and described in additional detail below. Nevertheless, the exoskeletons and exoskeleton hardware discussed herein may include numerous additional and alternative features, and other available peripheral components, for carrying out the various methods and functions of this disclosure.

Figure 2:
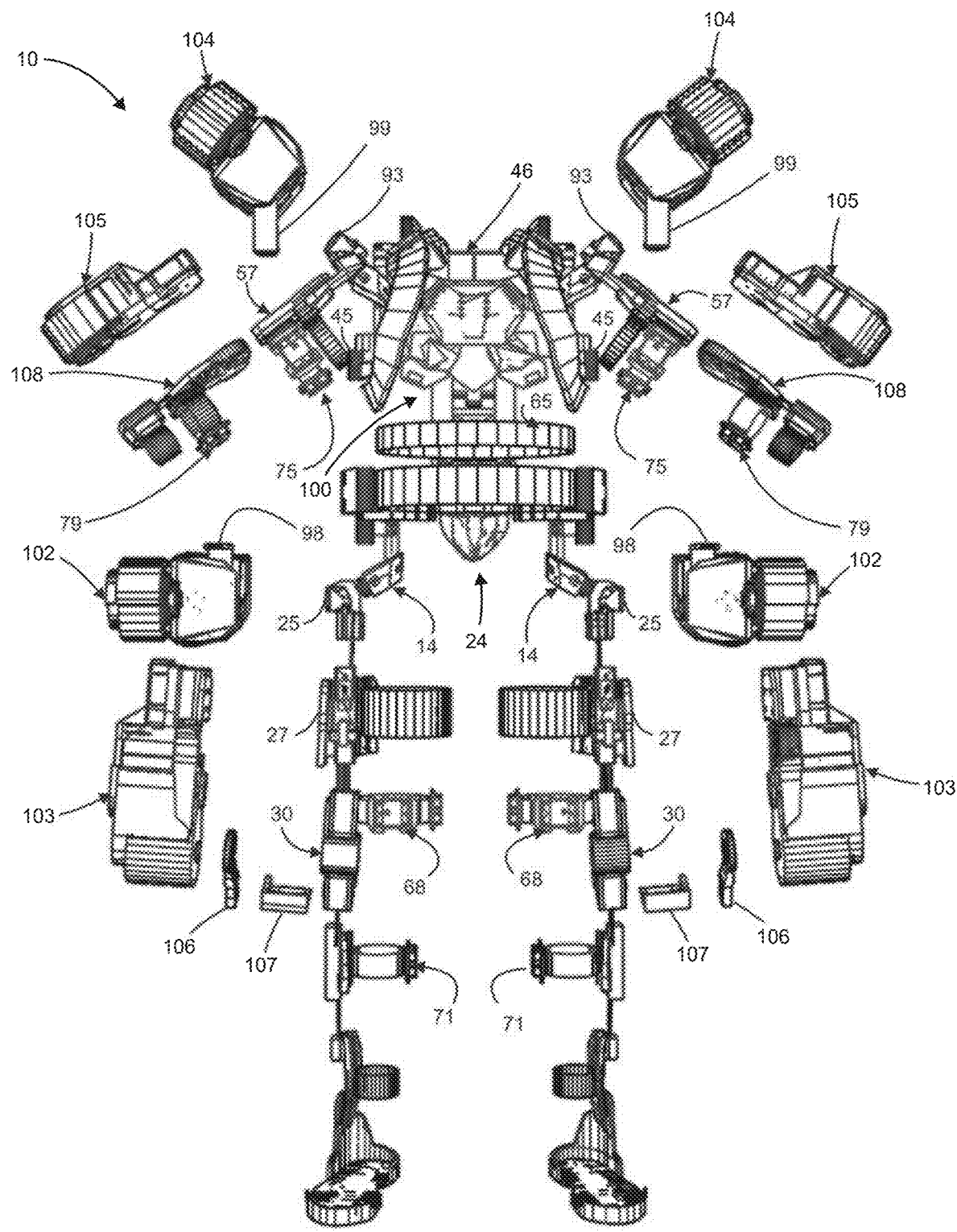
FIG. 2 is a partially exploded, front perspective-view illustration of a representative full-body modular exoskeleton system with motor unit modules and connectors for mounting motor unit modules to the exoskeleton frame of FIG. 1 in accord with aspects of this disclosure.

The exoskeleton system 10 of FIGS. 1 and 2 may be generally delineated into two interconnectable segments: (1) an upper extremity (first) frame section 10A, which generally extends from a waist-hip midpoint to the neck and physically mounts to the user's trunk region; and (2) a lower extremity (second) frame section 10B, which generally extends from the waist-hip midpoint to the ankles and physically mounts to the legs of a biped. The upper extremity frame section 10A of the exoskeleton system 10 is releasably joined via a hip assembly 14 to the lower extremity frame section 10B. With his arrangement, the exoskeleton system 10 may be readily modified (e.g., without specialized tools or permanently damaging the skeletal structure) for use of just the upper section 10A, just the lower section 10B, or both sections 10A, 10B. The hip assembly 14, in turn, is connected to an outer waist-hip beltloop shell 21, which includes a waist belt 15 that is looped through a central waist belt loop (not visible in the view provided) to secure the upper section 10A to the user's waist. A waist belt loop cover 22 is placed on top of the beltloop shell 21 to secure the waist belt 15; the beltloop shell 21 is then connected via a waist bracket C 20 to the hip assembly 14 and a spine unit assembly 58. A waist central unit and a waist bracket unit (not visible in this view) cooperate with waist bracket units 20 to create an adjustable waist support for the exoskeleton system 10.

A lower outer side region of the hip assembly 14 of FIGS. 1 and 2 connects to a pair of (left and right) exoskeleton hip motor adaptors 25, whereas a bottom region of each hip motor adaptor 25 connects to a respective (left or right) exoskeleton thigh assembly 26. An outer side region of each thigh assembly 26 is connected to a respective exoskeleton knee motor adaptor 27, whereas an inner side region of each thigh assembly 26 is connected to a respective femur outer shell 28. The left (first) and right (second) thigh assemblies 26 each employs a respective thigh strap 29 to releasably attach the thigh assemblies 26 and, thus, the lower extremity section 10B to a user's thighs/upper legs. Each thigh assembly 26 is connected to a respective tibial bracket connector 31 via a respective knee assembly 30 and a respective lower leg upper bracket 96. As will be described in further detail below, the two (left and right) knee assemblies 30 detachably mount thereto knee motor units for mechanization of the user's knee joints. An inner side region of each tibial bracket connector 31 is connected to a respective tibial outer shell 32 that may abut one of the user's tibias. An optional gas spring (not visible in the views provided) may connect the thigh assembly 26 to the knee assembly 30.

Continuing with the discussion of the exoskeleton's lower extremity section 10B, the two (left and right) tibial bracket connectors 31 are each connected to a respective ankle outer shell 33 via a respective lower leg bracket 35. The two (left and right) lower leg brackets 35 are attached to the (left and right) ankle outer shells 33 via respective shin size adjusters 34. Inner side regions of the ankle outer shells 33 are each provided with an ankle strap 95 that wraps around and releasably attaches the ankle outer shells 33 and, thus, the lower extremity section 10B to the user's ankles/lower legs. A bottom outer side region of each ankle outer shell 33 is attached to a respective exoskeleton foot outer shell 36, which seats thereon and operatively attaches to a user's foot/shoe/boot. The two (left and right) ankle outer shells 33 may articulate with respect to the tibial bracket connectors 31, the connectors 31 may articulate with respect to the thigh assemblies 26, and the thigh assemblies 26 may articulate with respect to the hip assembles 14.

To securely attach and selectively detach the lower extremity section 10B to the upper extremity section 10A, e.g., for a "full body" exoskeleton architecture, the hip assembly 14 releasably attaches to a bottom end of the spine unit assembly 58 via a socket assembly 23 and a tailbone outer shell 16. This spine unit assembly 58 connects at an upper end thereof to a flexible back plate assembly 38, which may abut a wearer's thoracic region. Left and right flanks of the back plate assembly 38 of FIGS. 1 and 2 are provided with respective shoulder outer shell assemblies 53 that contact the user's shoulders. A respective shoulder harness 47 releasably attaches each shoulder assembly 53 and, thus, the back plate assembly 38 and upper extremity section 10A to the user's left and right shoulders/upper body. In this vein, the two (left and right) shoulder harnesses 47 and the two (left and right) shoulder outer shell assemblies 53 aid in keeping the back plate 38 attached to the user's back. An outer side region of each exoskeleton shoulder assembly 37 attaches to an exoskeleton shoulder motor adaptor 93 for attaching thereto a respective shoulder motor unit. The shoulder assemblies 37 also couple to upper arm bracket assemblies 57, each of which includes an upper arm strap 94 that wraps around and releasably attaches the shoulder assemblies 37 and, thus, the upper extremity section 10A to the user's humerus/upper arm regions.

To transform the unassisted, passive-type exoskeleton architecture of FIG. 1 to a motor-assisted, active-type exoskeleton architecture, FIG. 2 presents a perspective view illustration of the modular exoskeleton system 10 of FIG. 1 with a distributed array of motor unit modules that are detachably connected via complementary motor unit connectors to the various motor adaptor sections of the exoskeleton 10. In accord with the illustrated example, a pair of (right and left) hip motor unit modules 102 mount on and drivingly connect to the hip motor adaptors 25 on the lower extremity section 10B of exoskeleton 10. Each modular hip motor unit 102 is equipped with a respective hip rotational bracket 98 that connects the motor unit 102 to the hip assembly 14. In so doing, the motor unit modules 102 are selectively actuable to boost and/or automate movement of the hip assemblies 14 and, thus, the hip joints and legs of the user. A pair of (right and left) knee motor unit modules 103 mount on and drivingly connect to the knee motor adaptors 27 via knee motor unit brackets 106. Each mated modular knee motor unit 103 and corresponding bracket 106 securely attach to their respective knee assembly 30 via a knee bracket alignment adaptor 107. In so doing, the motor unit modules 103 are selectively actuable to boost and/or automate movement of the knee assemblies 30 and, thus, the user's knee joints and lower legs. When operated in unison, the motor unit modules 102, 103 may assist with gaited locomotion of a user as well as jumping, squatting, climbing, lifting, etc.

With continuing reference to FIG. 2, a pair of (left and right) shoulder motor unit modules 104 mount on and drivingly connect to the shoulder motor adaptors 93 on the upper extremity section 10A of the exoskeleton 10. Each modular shoulder motor unit 104 is equipped with a respective shoulder rotational bracket 99 that securely connects the motor unit 104 to a back shoulder unit adaptor 45 on the back plate assembly 38. In so doing, the motor unit modules 104 are selectively actuable to boost and/or automate movement of the exoskeleton shoulder assemblies 37 and, thus, the shoulder joints and arms of the user. A pair of (left and right) elbow motor unit modules 105 mount on and drivingly connect to complementary forearm attachment assemblies 108. Each forearm attachment assembly 108 removably attaches to a user's forearms via straps (as shown). In this regard, each of the herein-described joint and appendage assemblies may employ straps, cables, harnesses, cuffs, or any other suitable means of attachment to operatively mount onto a user. Each of the modular elbow motor units 105 operatively attaches to a respective upper arm bracket assembly 57 on one of the exoskeleton shoulder assemblies 37. In so doing, the motor unit modules 105 are selectively actuable to boost and/or automate movement of the exoskeleton elbow assemblies and, thus, the user's elbow joints and forearms. When operated in unison, the motor unit modules 104, 105 may assist with movement of the upper appendages, e.g., to facilitate lifting, throwing, carrying, gait-related arm swing, etc.

To govern individual and synchronized operation of the motor unit modules 102, 103, 104, 105, the exoskeleton system 10 may employ a distributed array of sensing devices for actively monitoring real-time or near real-time user variables and system characteristics. The sensing devices may include: (1) a waist biometric sensor assembly 65; (2) a pair of thigh biometric sensor assemblies 68; (3) a pair of lower leg biometric sensor assemblies 71; (4) a pair of upper arm biometric sensor assemblies 75; and (5) a pair of forearm biometric sensor assemblies 79. A rechargeable battery pack 100 is attached to the back of the back plate assembly 38 and operable to power the exoskeleton's various electronic components. A lower body subsystem CPU 24 provisions input/output (I/O) logic-controlled operation of the sensors, motors, etc., of the lower extremity section 10B, whereas an upper body subsystem CPU 46 provisions I/O logic-controlled operation of the sensors, motors, etc., of the upper extremity section 10A. As noted above, detachment of the upper and lower extremity sections 10A, 10B of the active-passive exoskeleton 10 from each other creates a stand-alone lower body active/passive exoskeleton unit and a stand-alone upper body active/passive exoskeleton unit that may be operated independently from each other. This allows the user to further customize use of the exoskeleton 10 to a myriad of distinct upper and lower body applications. Additional information about the contents, arrangement, and functionality of the exoskeleton system 10 may be found in U.S. Provisional Patent App. No. 63/403,425 (hereinafter "'425 Application"), U.S. Provisional Patent App. No. 63/418,135 (hereinafter "'135 Application"), and U.S. patent application Ser. No. 18/160,356 (hereinafter "'356 Application"), each of which is incorporated herein by reference in its entirety and for all purposes.

Figure 3:
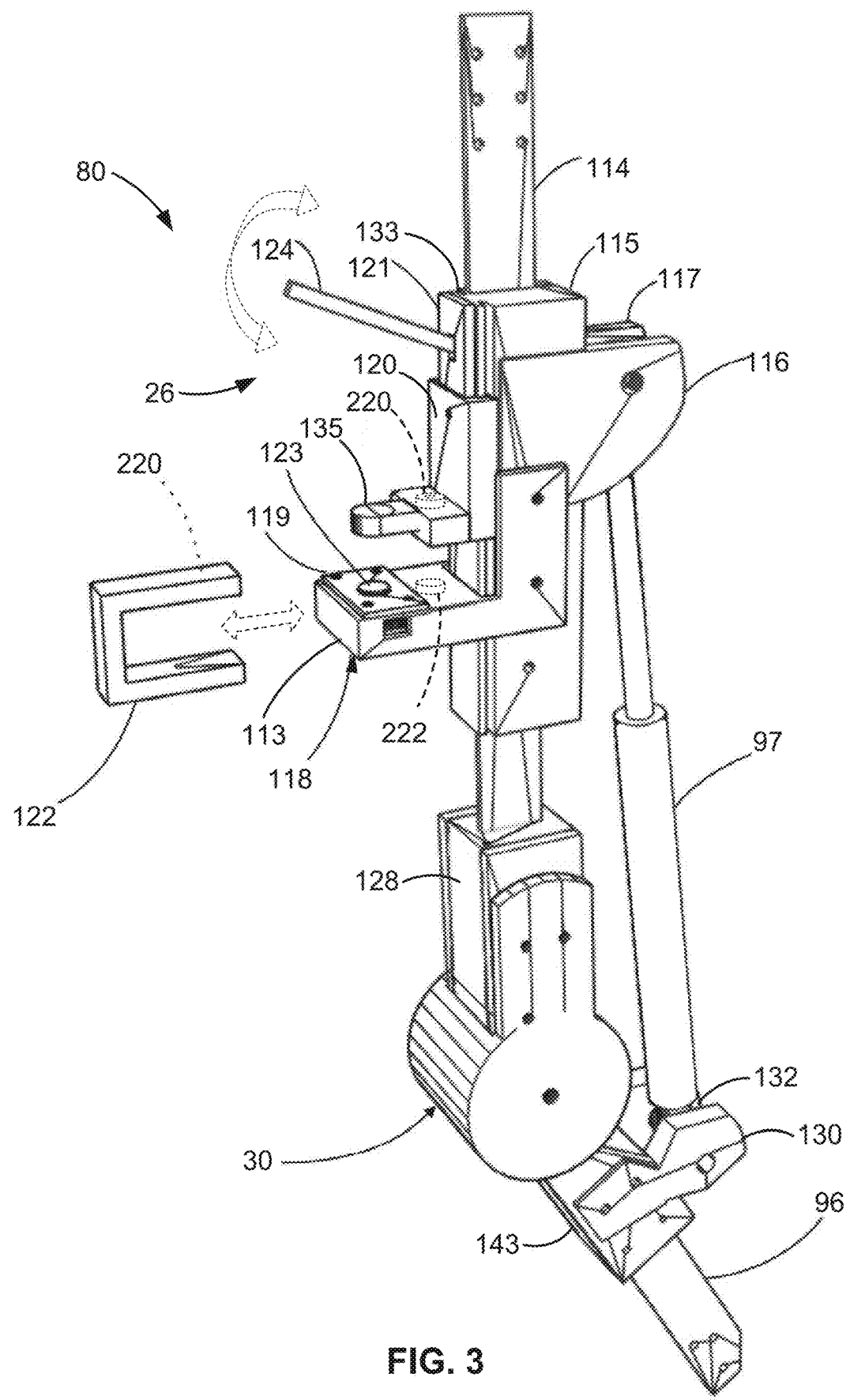
FIG. 3 is a side, perspective-view illustration of a representative articulating joint and appendage (J&A or passive knee and thigh) unit, shown in a locked state, for an exoskeleton system in accord with aspects of this disclosure.

Turning next to FIG. 3, there is shown an example of an articulating joint and appendage (J&A) unit 80 that may be adapted for use as the thigh assembly 26, knee motor adaptor 27, and knee assembly 30 of FIG. 2 (e.g., wherein left J&A units may be mirror images of right J&A units). The articulating J&A unit 80 of FIG. 3 (also referred to herein as "passive knee and thigh unit") is shown in a locked state in which flexion and extension of the knee assembly 30 in the sagittal plane is substantially or completely prevented. J&A unit 80 may generally comprise the thigh assembly 26 and thigh bracket 114, which are located at an upper end of the unit 80, and the knee assembly 30 with lower leg upper bracket 96, which are located at a lower end of the unit 80. In this view, the thigh bracket 114 inserts into a top end of an upper (femoral) knee joint connector 128 and thereby structurally connects the thigh assembly 26 to the knee assembly 30. With this arrangement, the thigh bracket 114 may be an elongated metal rail that is located adjacent to and extends the length of a user's femur, whereas the knee assembly 30 may be a spring-biased knuckle joint that is located adjacent to and articulates in unison with a user's knee joint.

Exoskeleton thigh assembly 26 includes a torsion thigh attachment bracket 115 that is vertically spaced from the knee assembly 30 and mounted (e.g., via press fit) onto a midsection of the thigh mount rail 114. Two (outer and inner) upper spring mount attachment plates 116 and 117 are mounted onto opposing (medial and lateral) sides of and project rearward from the thigh attachment bracket 115. Both spring mount attachment plates 116, 117 are sandwiched between a magnetic locking device 118 and are rigidly secured in place, e.g., via machine screws. An upper end of a fluid-filled (hydraulic or pneumatic) spring device 97, which may be in the nature of a wrist pin receiver of a piston rod, is fixed, e.g., via a machine screw, to the laterally spaced spring mount attachment plates 116, 117. A lower region of the spring device 97, which may be in the nature of an end fitting of a fluid cylinder, is fixed, e.g., via a machine screw, to laterally spaced (inner and outer) lower spring mount plates 130 and 132. The two lower spring mount attachment plates 130 and 132 are mounted onto opposing (medial and lateral) sides of and project rearward from a lower (tibial) knee joint connector 143 of the knee assembly 30.

With continuing reference to FIG. 3, the magnetic locking device 118 contains a motor/clutch button switch 123 that is selectively actuable to govern operation of a corresponding modular motor unit 103 (FIG. 2). The magnetic locking device 118 includes a protective locking mechanism housing 113 that houses the switch 123 components and rigidly affixes to the thigh attachment bracket 115, e.g., via machine screws. A sliding lock plate 120 of the device 118 is movably mounted onto a complementary slide track 133 of the thigh bracket attachment 115, e.g., to translate rectilinearly (up and down) in FIG. 3 relative to the thigh mount rail 114. At the same time, the sliding lock plate 120 is fixedly attached, e.g., via a machine screw, to a magnetic locking plate 121 such that the sliding lock plate 120, magnetic locking plate 121, and spring locking lever 124 translate in unison with one another. The spring locking lever 124 projects through complementary slots in the magnetic locking plate 121 and thigh bracket attachment 115 in order to mechanically couple to a top end of the spring device 97. With this arrangement, a user pivots the lever 124, e.g., in counterclockwise and clockwise directions in FIG. 3, to freely slide the locking plate 121 and, thus, the sliding lock plate 120 towards and away from the motor/clutch button switch 123 of the magnetic locking device 118. When the plate 120 is slid (downwards in FIG. 3) into abutting engagement with the housing 113, a plate-borne magnet 220 embedded in the slide lock plate 120 magnetically couples to a housing-borne magnet 222 embedded in the locking mechanism housing 113 to thereby magnetically secure the locking device 118 in an unlocked state, as best seen in FIG. 4.

Figure 4:
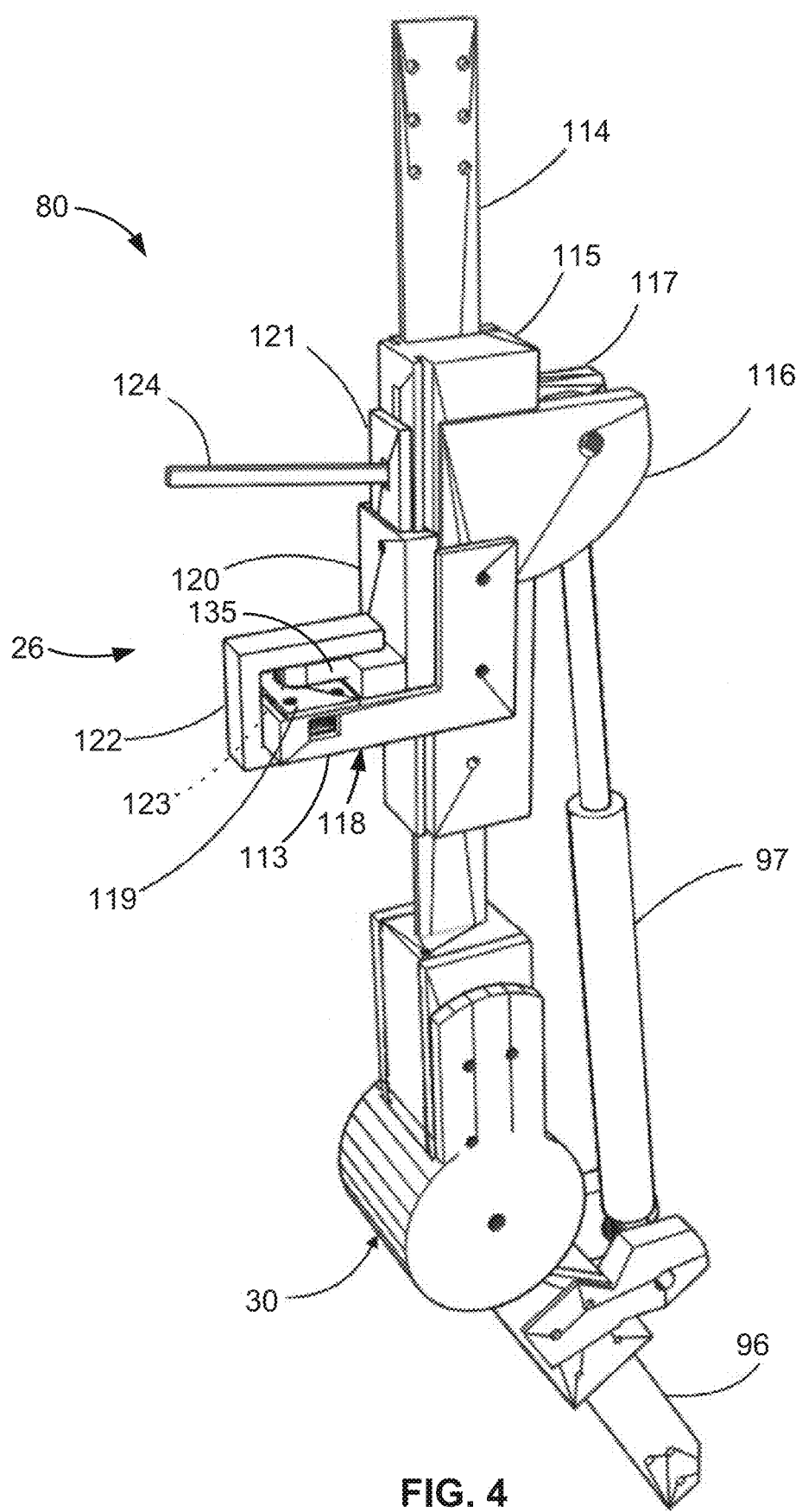
FIG. 4 is a side, perspective-view illustration of the representative articulating J&A unit of FIG. 3 shown in an unlocked state.

FIG. 4 portrays the articulating J&A unit 80 of FIG. 3 in an unlocked state that enables substantially or wholly unencumbered flexion and extension of the knee assembly 30. To unlock the spring device 97, a user pulls or presses down on the spring locking lever 124 to thereby slide the slide lock plate 120 and magnetic locking plate 121 against a button switch plate 119 and motor/clutch button switch 123. A C-shaped locking clip 122 is press fit onto a bottom surface of the housing 113 and a top surface of a T-shaped button cover flange 135 projecting orthogonally from the slide lock plate 120 to thereby lock the flange 135 onto the button switch 123 and retain the J&A unit 80 in the unlocked state. With this arrangement, the button cover flange 135 extends across and conceals the button switch 123. To lock the articulating J&A unit 80, the C-shaped locking clip 122 is removed from the housing 113 and cover flange 135; once removed, the user rotates the spring locking lever 124 (e.g., clockwise in FIG. 4) to move the slide lock plate 120 upwards and away from the magnetic locking device 118, as best seen in FIG. 3.

Figure 5:
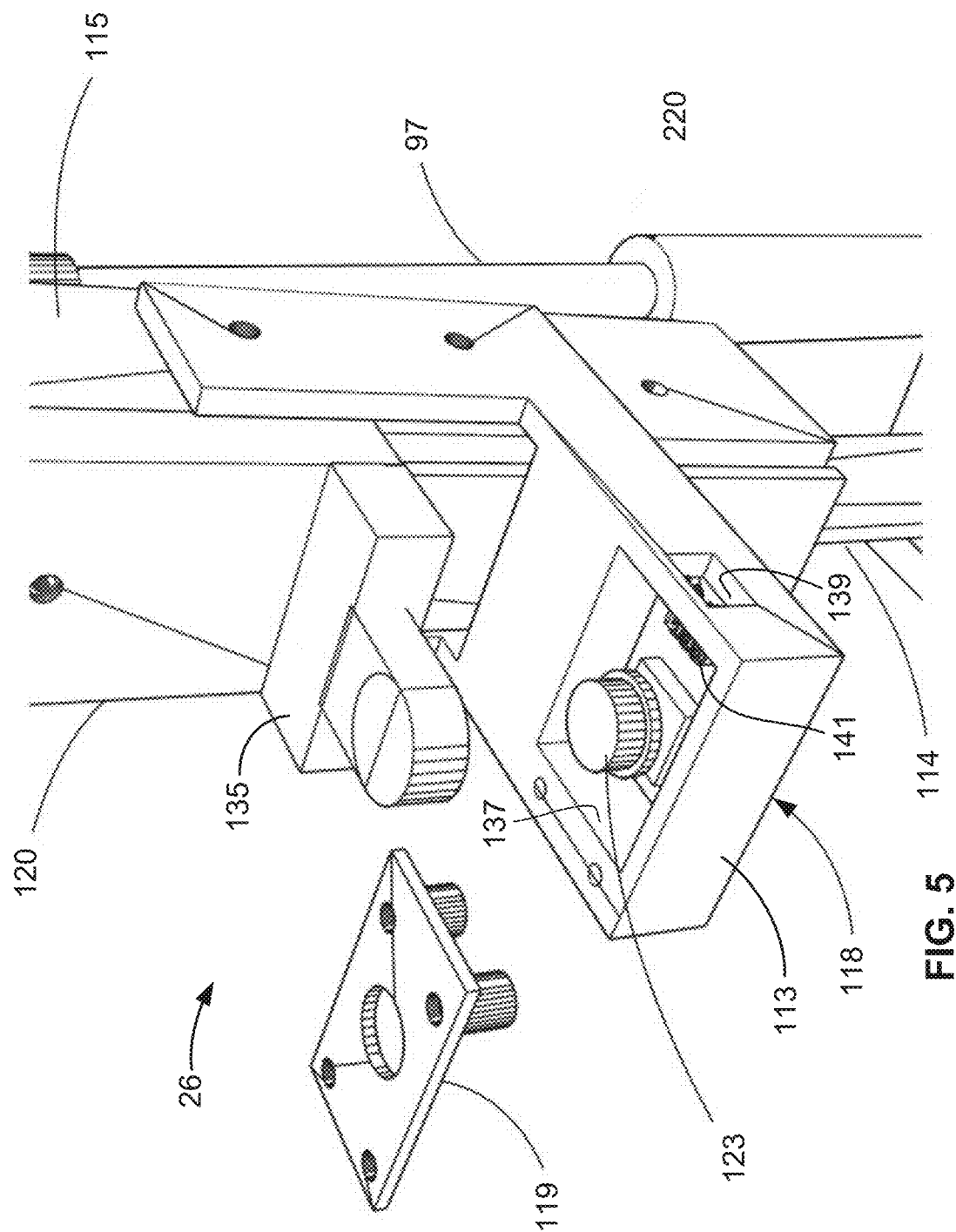
FIG. 5 is an enlarged and partially exploded perspective-view illustration of a representative motor-clutch button assembly of the representative articulating J&A unit of FIG. 3.

Presented in FIG. 5 is an enlarged and partially exploded view of the motor/clutch button switch 123 assembly of FIGS. 3 and 4 when the articulating J&A unit 80 is in the locked state. In this Figure, the button switch plate 119 is lifted off of the locking mechanism housing 113 to show the motor/clutch button switch 123 nested within a complementary button cavity 137 inside the housing 113. A plug port 139 extending through a lateral wall of the locking mechanism housing 113 allows a user to mate a motor connector plug (not shown) with a complementary electrical terminal 141 that is located inside the button cavity 137 to thereby electrically connect the motor unit 102 to the motor/clutch button switch 123. The button switch plate 119 may be rigidly secured to the housing 113, e.g., via machine screws, to cover the button cavity 137 with the motor/clutch button switch 123 protruding through a complementary throughhole in the button switch plate 119.

Figure 6:
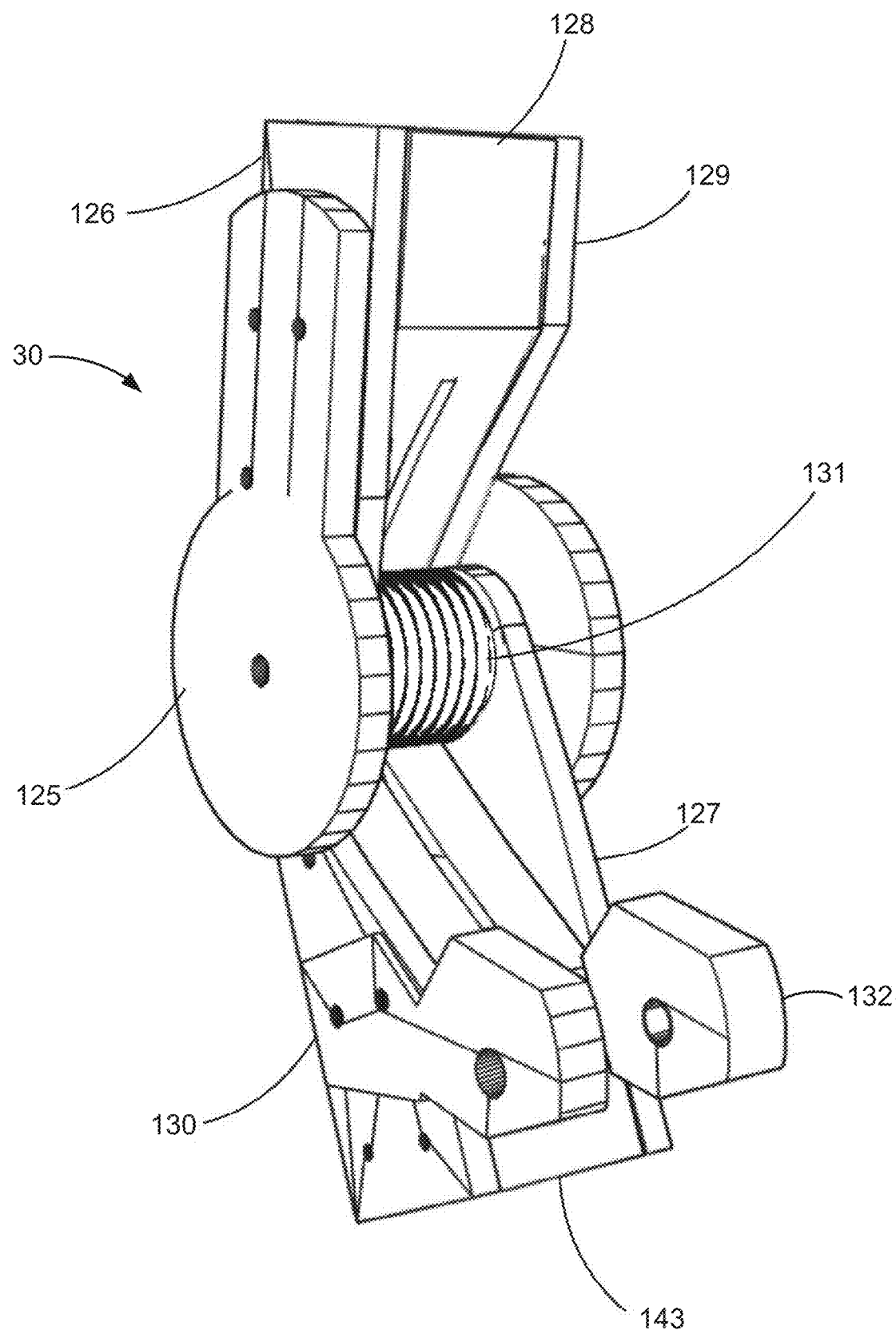
FIG. 6 is an enlarged, perspective-view illustration of a representative articulating joint (passive knee) subassembly of the representative articulating J&A unit of FIG. 3.

Turning next to FIG. 6, there is shown an enlarged, perspective view illustration of the backside of the knee assembly 30 of FIGS. 3 and 4. In this view, a biasing member, such as helical torsion spring 131, is located inside a spring cavity defined between the upper and lower knee joint connectors 128, 143. Complementary slots 147 and 149 (FIG. 7) in the upper and lower knee joint connectors 128, 143, respectively, each receives a leg of the spring 131. This torsion spring 131 passively biases the knee assembly 30 towards an open (extension) state seen in FIG. 6. Mounted onto lateral flanks of the upper knee joint connector 128, e.g., via machine screws, are first and second upper torsion power plates 126 and 129. Mounted onto lateral flanks of the lower knee joint connector 143 are first and second lower torsion power plates 111 and 127, onto which are fixedly mounted the lower spring mount plates 130 and 132, respectively.

Figure 7:
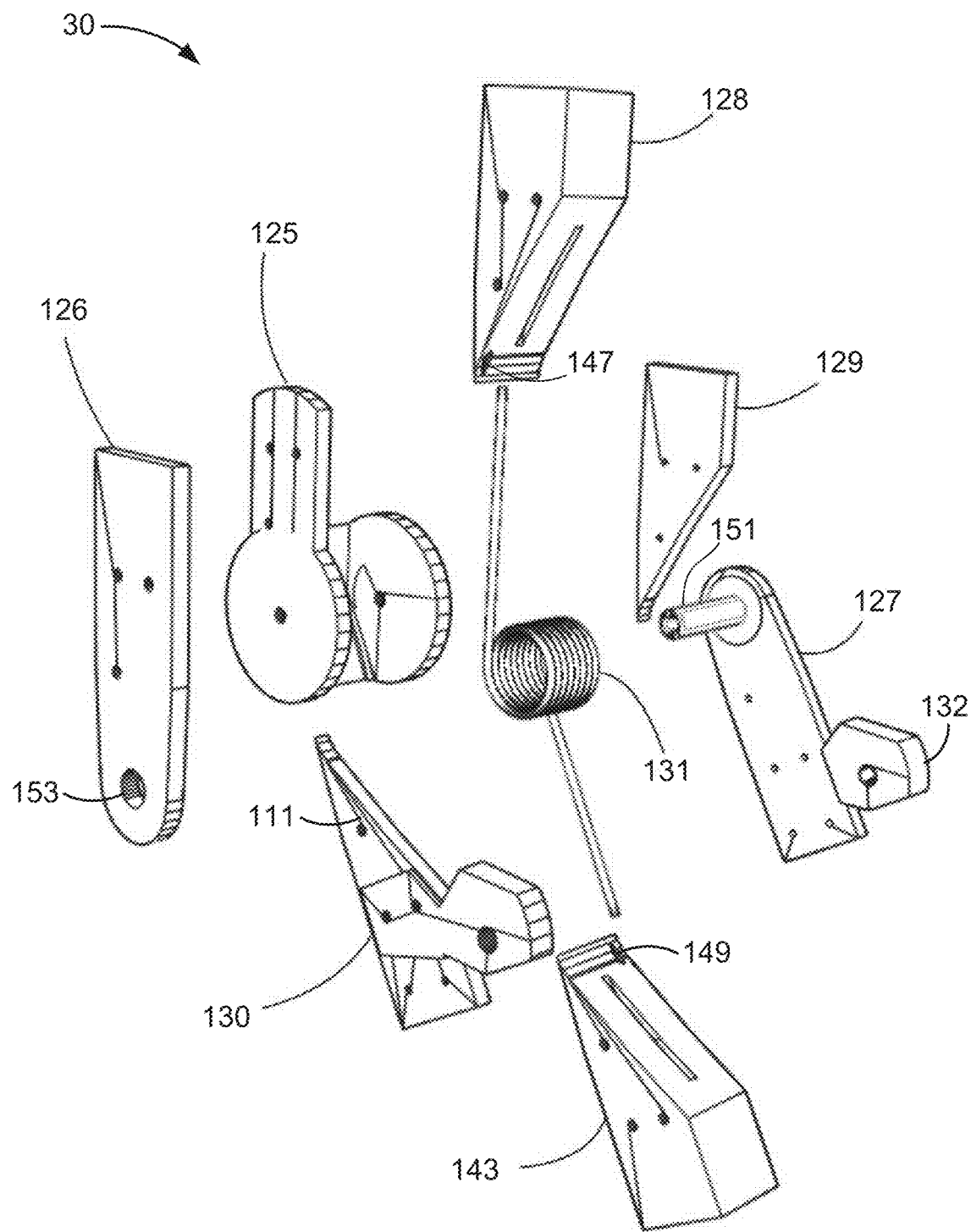
FIG. 7 is an exploded, perspective-view illustration of the representative articulating joint subassembly of FIG. 6.

Defining a forward (patella) face and two lateral (ACL/MCL) faces of the knee joint assembly 30 is a mediolateral kneecap cuff 125 within which are sandwiched the upper and lower knee joint connectors 128, 143, the upper and lower torsion power plates 126, 129, 111, 127, and the torsion spring 131. After fastening the upper power plates 126, 129 to the upper knee joint connector 128 and fastening the lower power plates 111, 127 to the lower knee joint connector 143, a male pivot shaft 151 integral with and projecting orthogonally from the second lower torsion power plate 127 passes axially through the spring 131 and press-fits into a female pin slot 153 in the first upper torsion power plate 126. The mediolateral kneecap cuff 125 is then pressed onto outer surfaces of the torsion power plates 126 and 127 and secured thereto, e.g., via multiple machine screws. An optional bottom bracket, cotter pin, clevis pin, or similarly suitable connector (not shown) may then be passed through holes in the kneecap cuff 125 that axially align with a hollow central core of the male pivot shaft 151. FIG. 7 presents an exploded view of the knee assembly 30 structure in FIG. 6 to better show the individual structural geometries of the knee assembly components described above.

Figure 8:
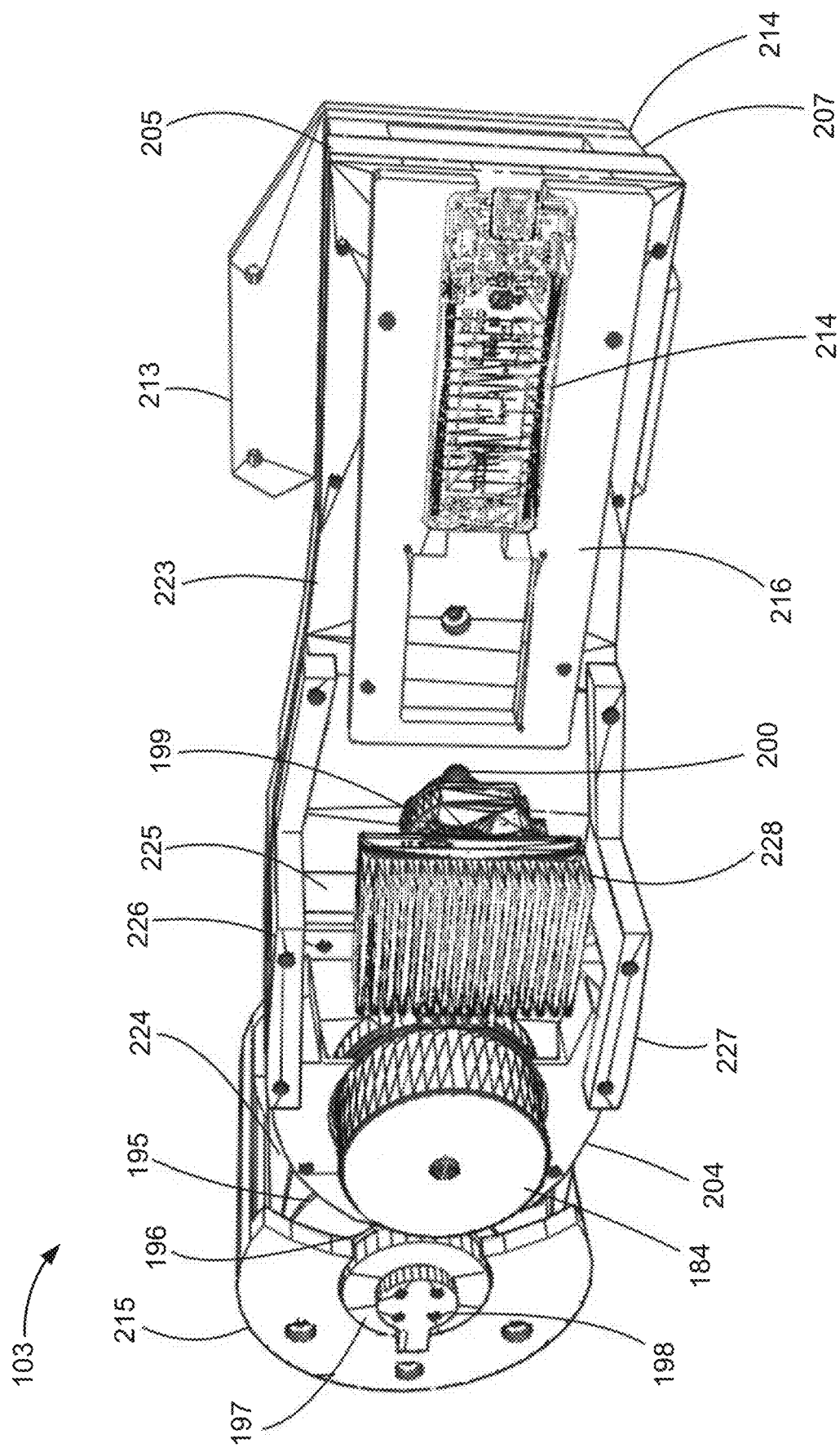
FIG. 8 is a front, perspective-view illustration of a representative modular (hybrid knee) motor unit with motor-clutch power transmission assembly in accord with aspects of this disclosure.
Figure 11:
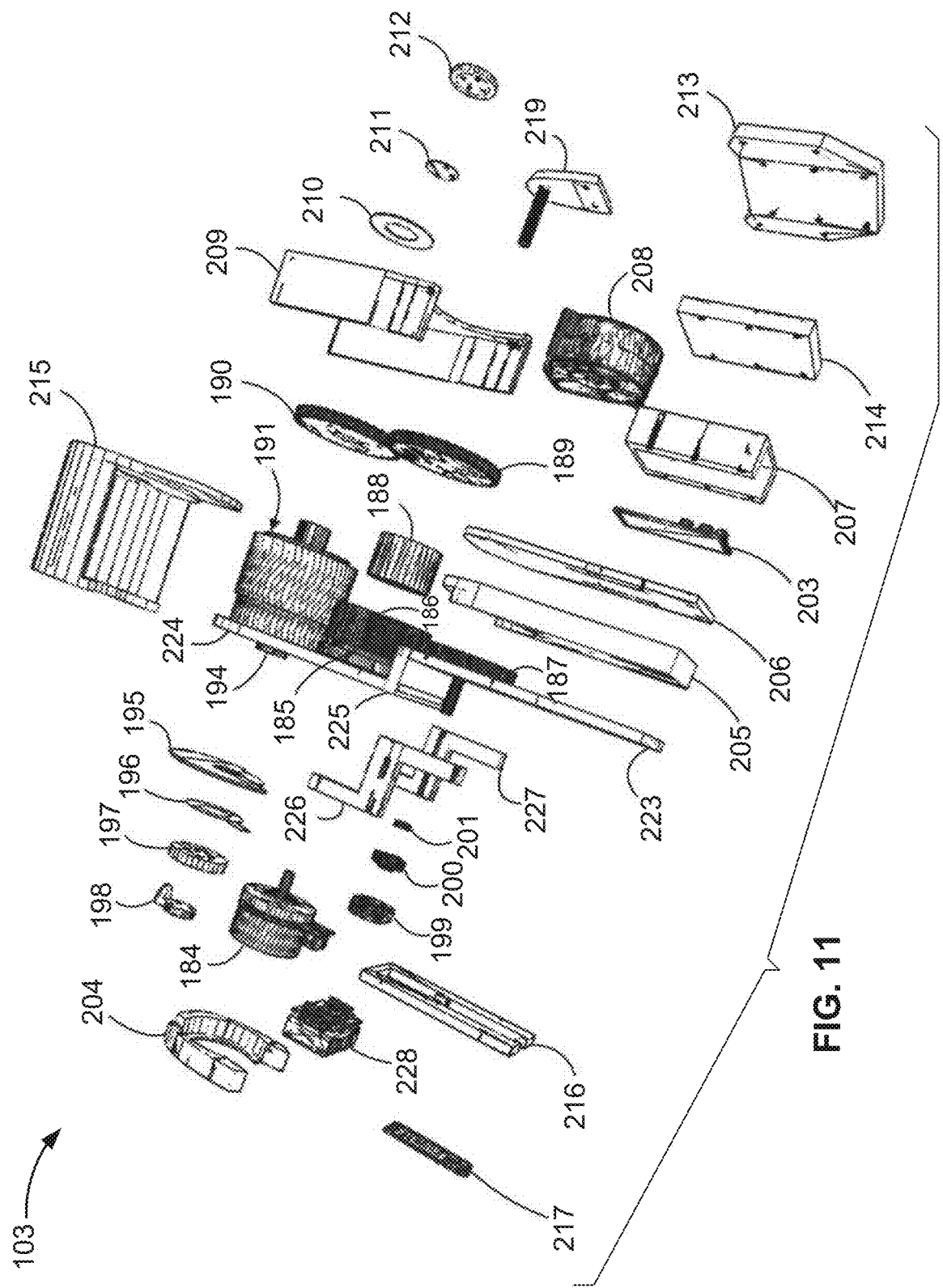
FIG. 11 is a partially exploded, top perspective-view illustration of the representative modular motor unit and motor-clutch power transmission assembly of FIG. 8.

Turning next to FIG. 8, there is shown an example of a modular (hybrid knee) motor unit 103 that may be adapted for use as the hip motor unit modules 102, knee motor unit modules 103, shoulder motor unit modules 104, and/or elbow motor unit modules 105 of FIG. 2 (e.g., wherein left motor units may be mirror images of right motor units). In the illustrated example, the modular motor unit 103 employs a first staggered motor plate 223 that is securely attached to a second staggered motor plate 224 to collectively define a foundational support structure onto which is mounted many of the motor unit's constituent internal parts. The first and second staggered motor plates 223, 224 may be rigidly joined together by a third staggered motor plate 225, for example, via machine screws, such that the motor plates 223, 224 are substantially parallel to each other and substantially orthogonal to the motor plate 225, as best seen in FIG. 11. It may be desirable that the first and second motor plates 223, 224 be made from a fiber-reinforced polymer (FRP) material to help minimize the motor unit's weight, whereas the third motor plate 225 may be made of steel, steel alloys, or other rigid material to increase the foundational support structure's strength and durability. A protective and weather-resistant outer housing, such as a motor unit cover (see, e.g., FIGS. 33 and 37 of '425 Application), may cover the constituent parts of the motor unit 103.

To stabilize and reinforce the staggered motor plates 223, 224, 225, the motor unit 103 of FIGS. 8-11 may employ one or more zigzag-shaped motor plate rails (or "ligaments") 226 and 227 that may rigidly mount to and sit substantially flush against the first and third motor plates 224, 224. Stabilizing motor plate rails 226, 227 may be fixed to interior faces of the first and third motor plates 223, 225 via machine screws. Located at a distal (first) longitudinal end of the motor unit 103 is an electric knee motor 184, which may be in the nature of a brushless direct-current (DC) motor, and may be at least partially circumscribed by a C-shaped motor wire channel cover 204. A knee motor driver 228, which is wired to the knee motor 184, and a knee motor unit CPU 217 are shown mounted onto the interior face of the first motor plate 223. In the same vein, an electronic absolute position encoder 199 is mounted to a knee encoder hub 200, both of which are mounted onto the first motor plate 223 located between the motor driver 228 and motor plate 223. Additional information about the structural configuration and operation of the motor unit 103 may be found, for example, in FIGS. 8-11 and the corresponding description thereof in the '356 Application.

Located at a proximal (second) longitudinal end of the motor unit 103, opposite that of the motor 184, is a knee motor unit CPU 217 that is mounted via a CPU adaptor bracket 216 to the interior face of the first motor plate 223, e.g., using machine screws. The knee motor unit CPU 217 receives and processes sensor signals, user inputs, centralized control commands, and closed-loop system feedback, such as position data signals output from the absolute position encoder 199. Using this data, the motor unit CPU 217 controls the PCB package and motor driver 228 and thereby governs operation of the motor 184. The knee motor 184, along with a knee motor wire channel cover 204, a clutch position sensor base 195, and a clutch case cap 215, are fixedly mounted onto the second motor plate 224, e.g., via machine screws. This packaging arrangement allows for a clutch touch position sensor 196, which is attached to the clutch position sensor base 195, to be readily accessed and viewed by a user. A flexible touch position contact wiper 198 sits on top of the clutch position sensor base 197 and makes precise contact with clutch touch position sensor 196 to aid in operative alignment of the motor 184 with the clutch and user's limb prior to engagement of the modular motor unit 103.

Figure 9:
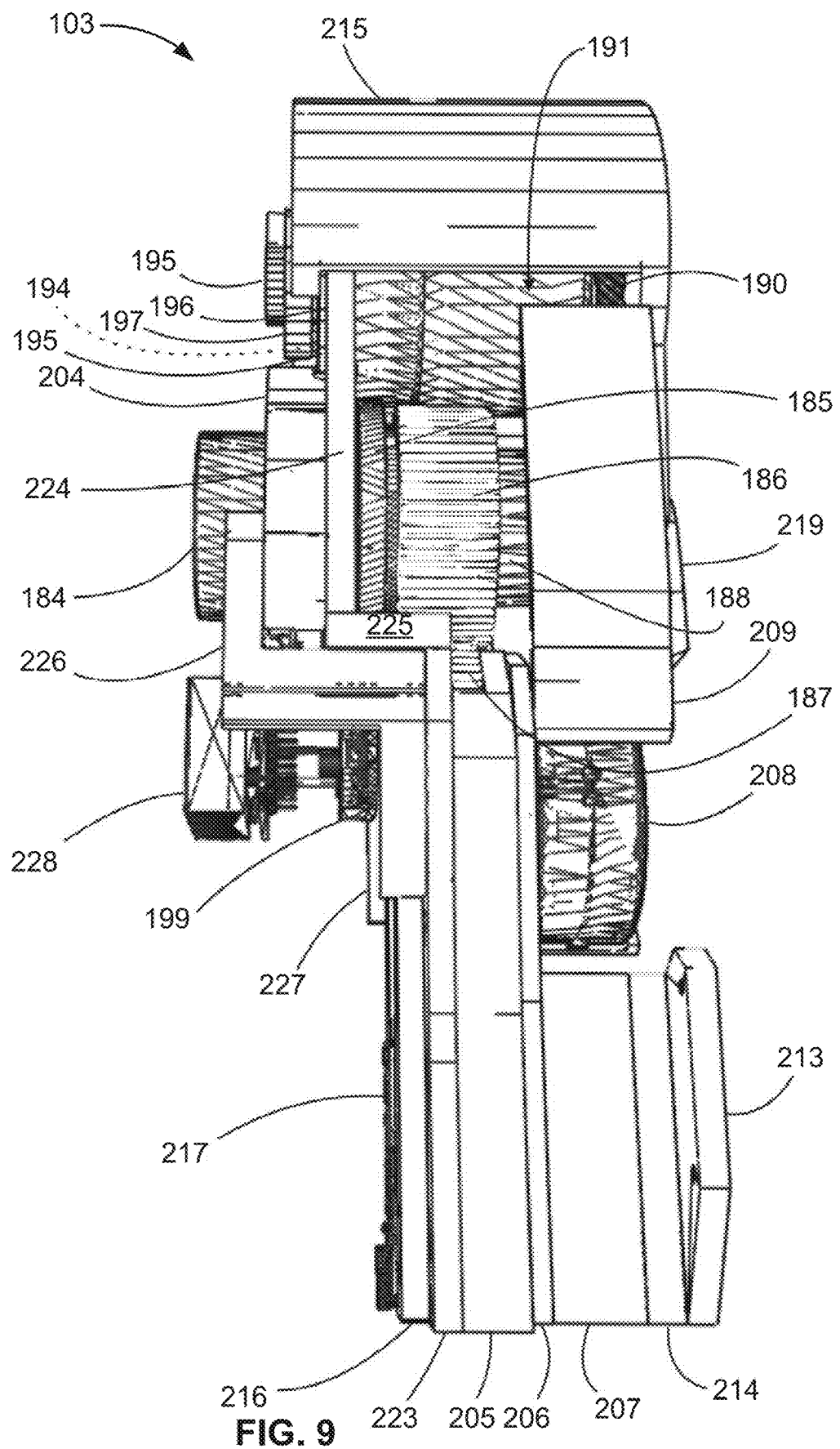
FIG. 9 is a plan-view illustration of the representative modular motor unit and motor-clutch power transmission assembly of FIG. 8.

FIG. 9 is plan-view illustration of the modular motor unit 103 of FIG. 8, provided to more clearly show the "zig-zag" staggered arrangement of the three motor plates 223, 224, and 225 and the motor components attached thereto. In this view, an electromagnetic clutch assembly 191 is shown mounted onto a rear face of the second motor plate 224 and drivingly connected to the motor 184. A power-transmitting helical idler gear 190 with a central bore hole is drivingly connected to the EM clutch assembly 191, e.g., via machine screws, to rotate on an EM clutch output shaft 194 thereof. Also drivingly connected to the keyed output shaft 194 of the clutch assembly 191—on a side of the motor plate 224 opposite that of the helical idler gear 190—are the position contact wiper 198 and the clutch position sensor base 195. Rotatably mounted inside a shaft through-hole in the motor plate 224, the keyed output shaft 194 extends coaxially through the centers of the clutch assembly 191 and helical idler gear 190.

Knee motor 184 is drivingly connected to a knee harmonic drive unit 185 that is mounted onto the opposite side of the motor plate 224 as the motor 184 and the same side as the clutch assembly 191. Unlike most traditional gear-reduction boxes, which employ rigid, circular gears, a harmonic drive unit uses a flexible "spline" gear that is driven by an elliptical, toothless "plug" cam that receives torque output from the motor. Operating as a gear-reduction device to selectively increase motor torque, the harmonic drive unit 185 is drivingly connected to a knee position driven gear 186 and a driven gear power transfer spacer 188 such that the harmonic drive unit 185 is both physically and drivingly interposed between the driven gear 186 and the motor 184. With this arrangement, the driven gear 186 is sandwiched between the harmonic drive unit 185 and the spacer 188. The driven gear 186 meshes with a knee position idler gear 187, which is rotatably mounted onto the first motor plate 223 and drivingly connected to the rotational position encoder 199 to aid in monitoring real-time motor position of the knee motor 184. During operation of the knee motor 184, the motor shaft will rotate the harmonic drive unit 185, which concomitantly reduces the motor's rotational output speed while increasing the motor's torque output.

Figure 10:
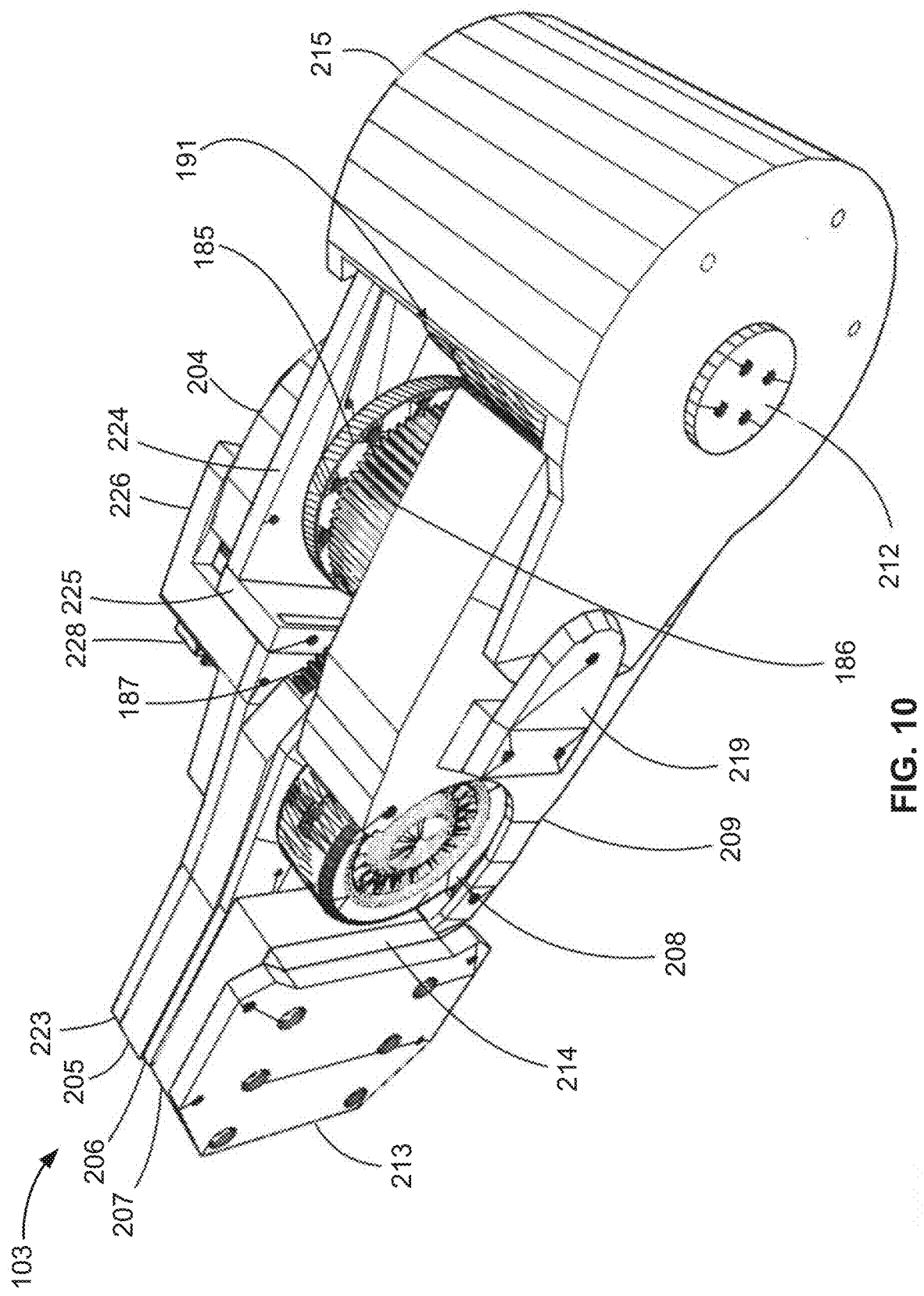
FIG. 10 is a rear, perspective-view illustration of the representative modular motor unit and motor-clutch power transmission assembly of FIG. 8.

With collective reference to FIGS. 9-11, an underside post plate 219 with an orthogonally projecting mounting post attaches the CPU adaptor plate 216 on the front side of the motor unit 103 to a cooling duct cover 209 on the back side of the motor unit 103, e.g., to aid in power transfer stabilization. A position idler gear outer shell 205 rigidly mounts onto the first motor plate 223 and partially covers the knee position idler gear 187. An H-bridge and cooling fan plate 206, which mounts onto an outward facing surface of the idler gear outer shell 205, bears a clutch h-bridge driver 203 and a clutch driver cover 207 that conceals and protects the driver 203. An outer adaptor attachment plate 213 mounts onto an exterior surface of an inner adaptor attachment plate 214, which mounts onto an exterior surface of the clutch driver cover 207. A motor cooling fan 208 mounts onto an outward-facing surface of the cooling fan plate 206 and, via the plate 206, to the first motor plate 223.

FIG. 10 presents a perspective view of the exoskeleton-facing rear side of the motor unit 103 of FIGS. 7-9 as would be seen from the left-hand or right-hand sides of the exoskeleton system 10 in FIG. 2 after mounting the motor unit 103 onto one of the motor adaptor 27 and knee assemblies 30. In this view, the fan blades of cooling fan 208 are exposed through the cooling fan duct 209 with the cooling fan 208 packaged between the clutch driver cover 207 and a fluid passage inside of the cooling fan duct 209. At the same time, the outer adaptor attachment plate 213 is fastened, e.g., by way of machine screws, that pass through the inner adaptor attachment plate 214 and clutch driver cover 207 into the cooling fan plate 206. To transmit motor torque from the motor unit module 103 to one of the knee assemblies 30 of the exoskeleton 10, each motor unit 103 includes a motor attachment plate (or "connecting hub") 212 that is drivingly connected to the electric motor 185 via the harmonic drive 185, clutch assembly 191 and helical idler gear 190.

In the partially exploded view of FIG. 11, the mounting locations and relative orientations of the various motor components attached to the staggered motor plates 223, 224 and 225 are observed in detail. For instance, the electromagnetic clutch assembly 191 is shown mounted at the distal-most end of the second motor plate 224 and, once assembled, covered by the clutch case cap 215. The keyed output shaft 194 is shown extending transversely through the motor plate 224 and fitting coaxially through the toroidal members of the clutch assembly 191. A power-driven helical gear 189 is meshingly engaged with the helical idler gear 190 and securely fastened to the power transfer spacer 188, e.g., via machine screws, to rotate in unison therewith. FIG. 11 also shows the harmonic drive unit 185 attached to the exoskeleton-facing side of the motor plate 224 and drivingly connected to the driven gear 186, which is mounted to the outboard-facing side of the motor plate 224. In this view, the motor-position-tracking driven gear 186 is observed meshing with the position idler gear 187 and, via the idler gear 187, drivingly coupled to the encoder 199.

FIG. 11 also shows the mounting order of the knee encoder flanged bearing 201, which abuts the first motor plate 223 and seats on the output shaft of the position idler gear 187, an encoder hub 200 mounted onto the flanged bearing 201, and the absolute encoder 199 mounted onto the encoder hub 200. The knee motor driver 228 is then mounted onto the outboard-facing surface of the absolute encoder 199. FIG. 11 further shows the clutch position sensor base 195 mounted onto the outboard-facing surface of the second motor plate 224 in abutting relation with the keyed output shaft 194, the clutch's touch position sensor 196 mounted onto the position sensor base 195, the clutch position sensor wiper base 197 mounted onto the position sensor 196, and the flexible touch position contact wiper 198 mounted onto the wiper base 197. With this arrangement, the touch position sensor 196, sensor wiper base 197, and position contact wiper 198 are coaxial with the electromagnetic clutch assembly 191 and axially offset from the electric motor 184 and harmonic drive unit 185.

During operation of the modular knee motor unit 103, the clutch h-bridge driver 203 controls the engagement and disengagement of the clutch assembly 191 and, thus, the motor-borne output of the unit 103. Motor torque is produced by the motor 184, transferred from the motor 184 through the harmonic drive 185 to the clutch assembly 191, and from the clutch assembly 191 out through the motor attachment plate. In this example, a power idler gear spacer 210 is seated on an exterior face of the cooling cover duct 209 with a keyed shaft spacer 211 abutting the power idler gear spacer 210. Once assembled, the power idler gear spacer 210 and keyed shaft spacer 211 are sandwiched between the cooling cover duct 209 and the clutch case cap 215 with the motor attachment plate 212 fastened to the keyed shaft spacer 211.

Figure 12:
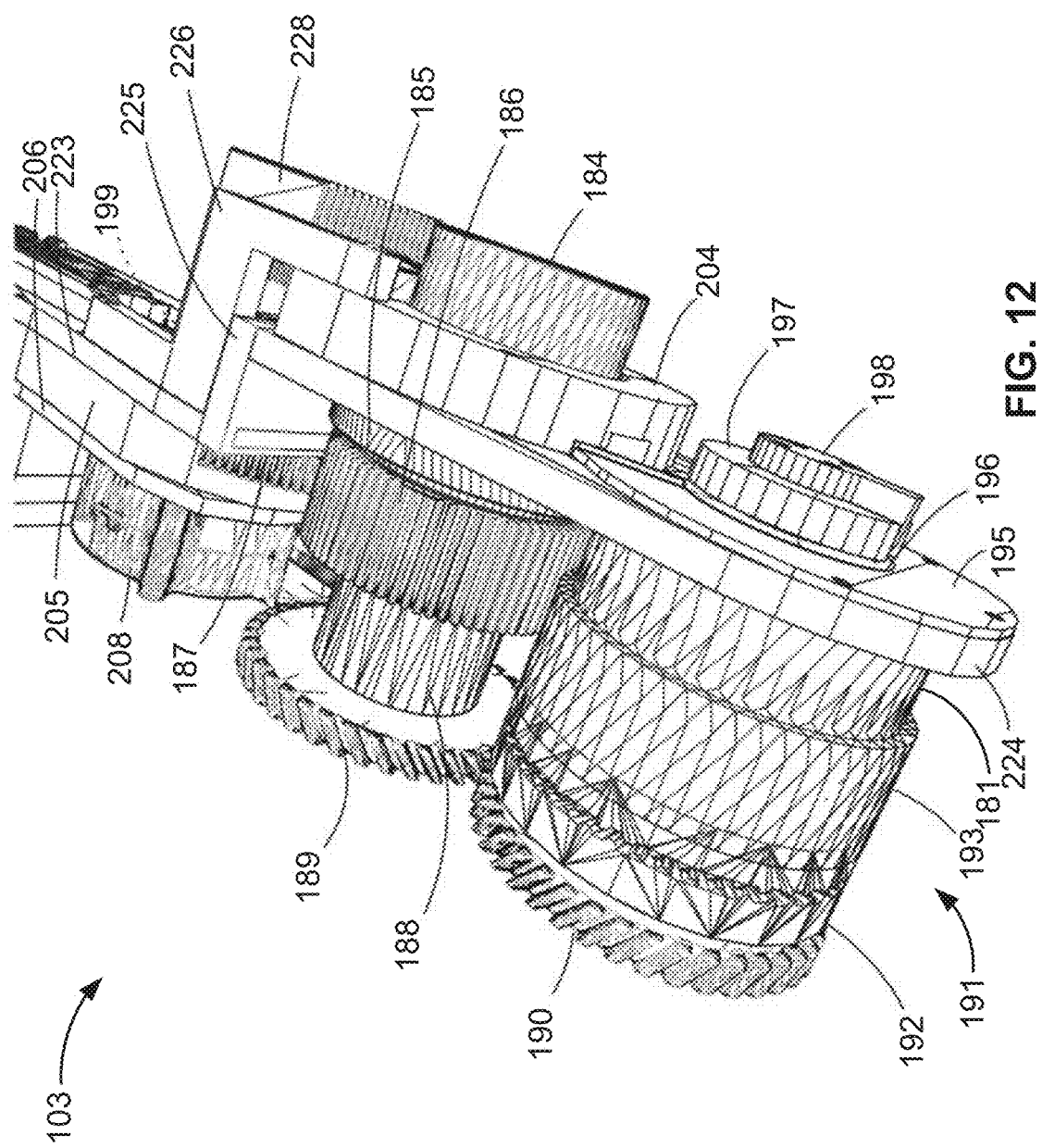
FIG. 12 is a top, perspective-view illustration of the representative motor-clutch power transmission assembly of FIG. 8 shown without the clutch case cap and cooling fan duct.

Presented in FIG. 12 is an enlarged perspective-view of the motor-clutch power transmission of the modular motor unit 103 of FIGS. 7-11 (shown without the clutch case cap 215 and cooling fan duct 209). This view shows the knee motor 184 mounted onto the outboard-facing (front) surface of the second motor plate 224 and axially parallel to the clutch assembly 191 and the cooling fan 208. The harmonic drive unit 185, position driven gear 186, gear spacer 188, and driven helical gear 189 are shown mounted onto the exoskeleton-facing (back) surface of the second motor plate 224 mutually coaxial with one another and the motor 184. FIG. 12 also shows that the electromagnetic (EM) clutch assembly 191 includes an EM clutch hub/armature 192 and an EM clutch rotor/coil 193 that are coaxial with one another and rotatably mounted to the second motor plate 224. The EM clutch rotor 192 is coaxial with and drivingly connected to the power helical idler gear 190, e.g., by way of machine screws; through this connection, the clutch assembly 191 drivingly connects to the motor unit 184. The touch position contact wiper 198, clutch position sensor wiper base 197, clutch touch position sensor 196, and clutch position sensor base 195 are coaxially aligned with and operatively attached to the EM clutch rotor 193; through this connection, the clutch assembly 191 drivingly connects to the output shaft 194. Cooling fan 208 is used to cool the clutch assembly 191, harmonic drive unit 185, etc., to prevent overheating.

Figure 13:
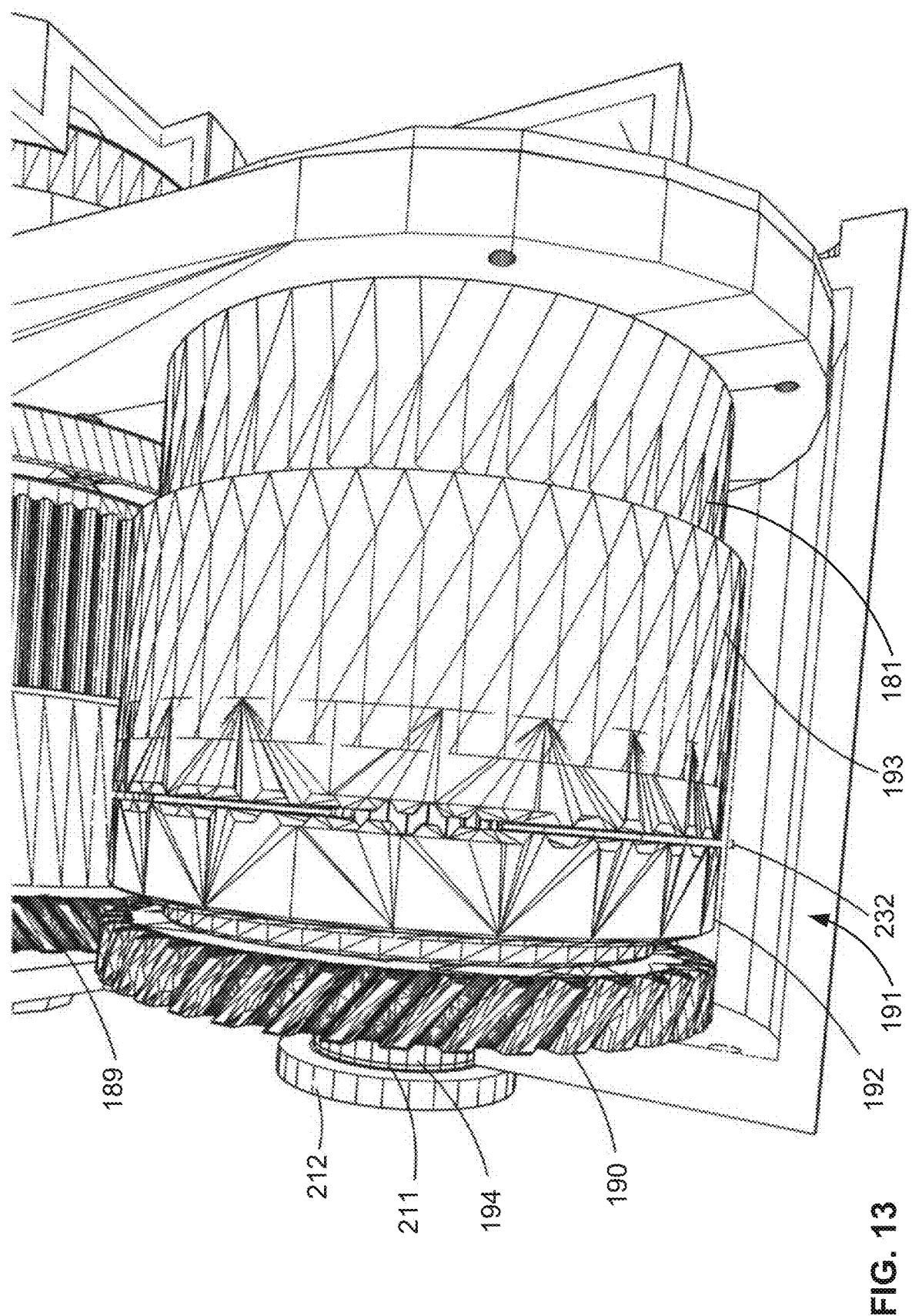
FIG. 13 is an enlarged and partially cut-away perspective-view illustration of the representative motor-clutch power transmission assembly of FIG. 8 shown in a disengaged (passive) operating mode.

FIG. 13 illustrates the EM clutch assembly 191 in a disengaged operating mode in which the EM clutch rotor 192 is not magneto-mechanically coupled to the EM clutch rotor 193. When the clutch assembly 191 is powered off, electrical current does not flow through an electromagnetic-field producing EM coil 181 adjacent the rotor 192. With no magnetic field, the EM clutch rotor 192 is axially spaced away from EM clutch rotor 193 (e.g., shifted leftward in FIG. 13); in so doing, a first set of axially projecting face (Hirth-type) gear teeth on a motor-plate-facing surface of the clutch rotor 192 are mechanically disengaged from a second set of face (Hirth-type) gear teeth projecting axially from a connecting-hub-facing surface of the clutch rotor 193. During disengagement of the clutch assembly 191, a clutch gap 232 may exist between the torque-carrying clutch components 192, 193. In this state, the output shaft 194 may freely rotate with the clutch rotor 193, for example, to allow a user to move or stand without the assistance of the electric knee motor 184. For at least the illustrated example, the EM clutch assembly 191 may default to this normally disengaged state.

Figure 14:
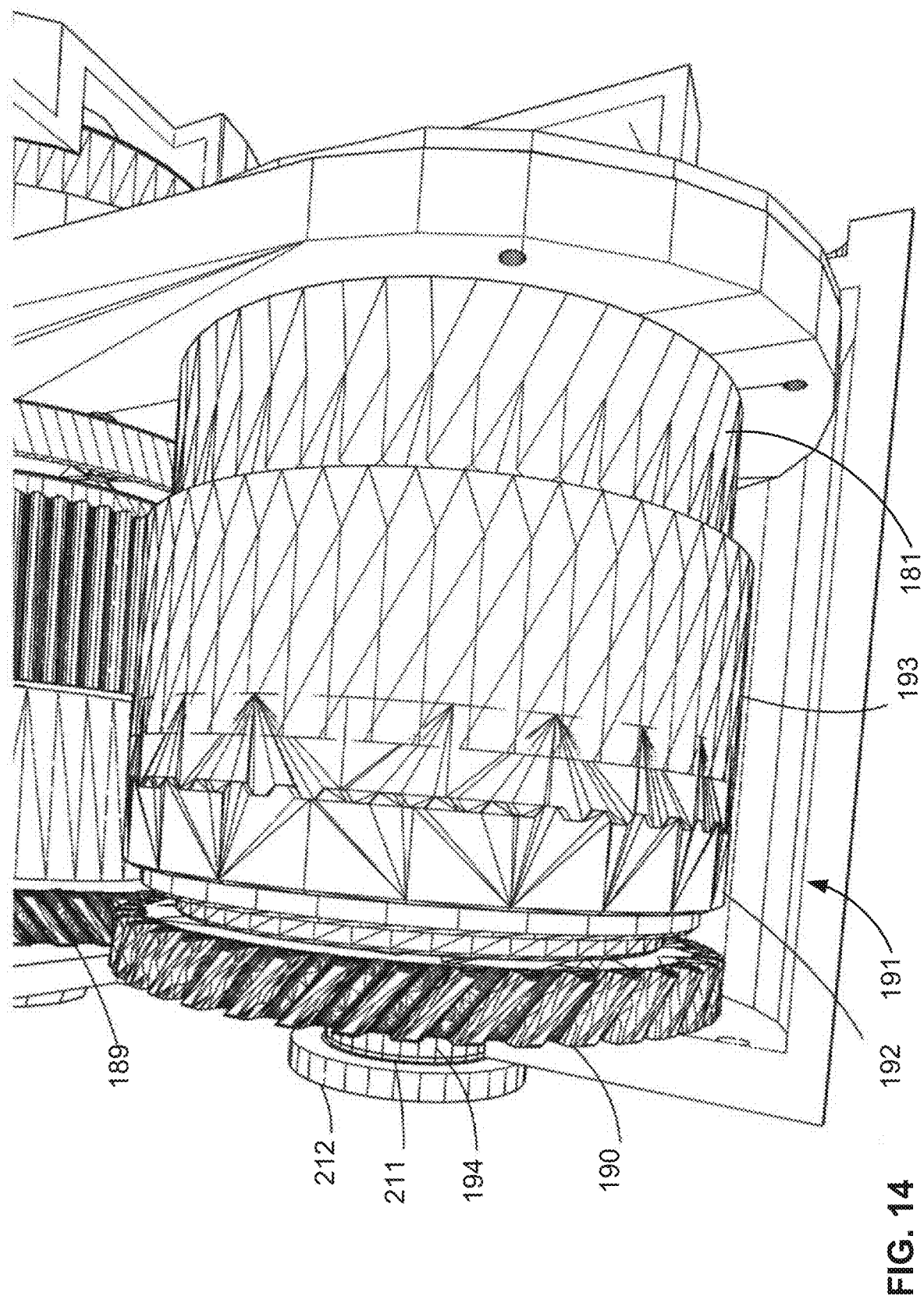
FIG. 14 is an enlarged and partially cut-away perspective-view illustration of the representative motor-clutch power transmission assembly of FIG. 8 shown in an engaged (active) operating mode.

As an illustrative comparison to FIG. 13, the EM clutch assembly 191 is shown in FIG. 14 in an engaged operating mode in which the EM clutch rotor 192 is magneto-mechanically coupled to the EM clutch rotor 193 and, via this active clutch coupling, to the motor unit 184. When the clutch assembly 191 is powered on, electrical current flows through the electromagnetic-field producing coil 181 adjacent the rotor 192. With an active magnetic field, the EM clutch rotor 192 translates rectilinearly towards the EM clutch rotor 193 (e.g., shifted rightward in FIG. 13); in so doing, the face gear teeth and cavities on the clutch rotor 192 are mechanically engaged with the axially projecting face gear teeth and axially recessed cavities in the clutch rotor 193. During active engagement of the clutch assembly 191, the EM clutch the rotor 192 closes the clutch gap 232 between the torque-carrying clutch components 192, 193. In this state, the output shaft 194 rotates with the motor 184 via the driving engagement between the motor 184 and power driven helical gear 189 thus rotating and transmitting torque power to the power helical idler gear 190. In this state, the output shaft 194 may rotate in unison with the clutch rotor 193, for example, to allow a user to move or stand with the assistance of the electric knee motor 184.

Figure 15:
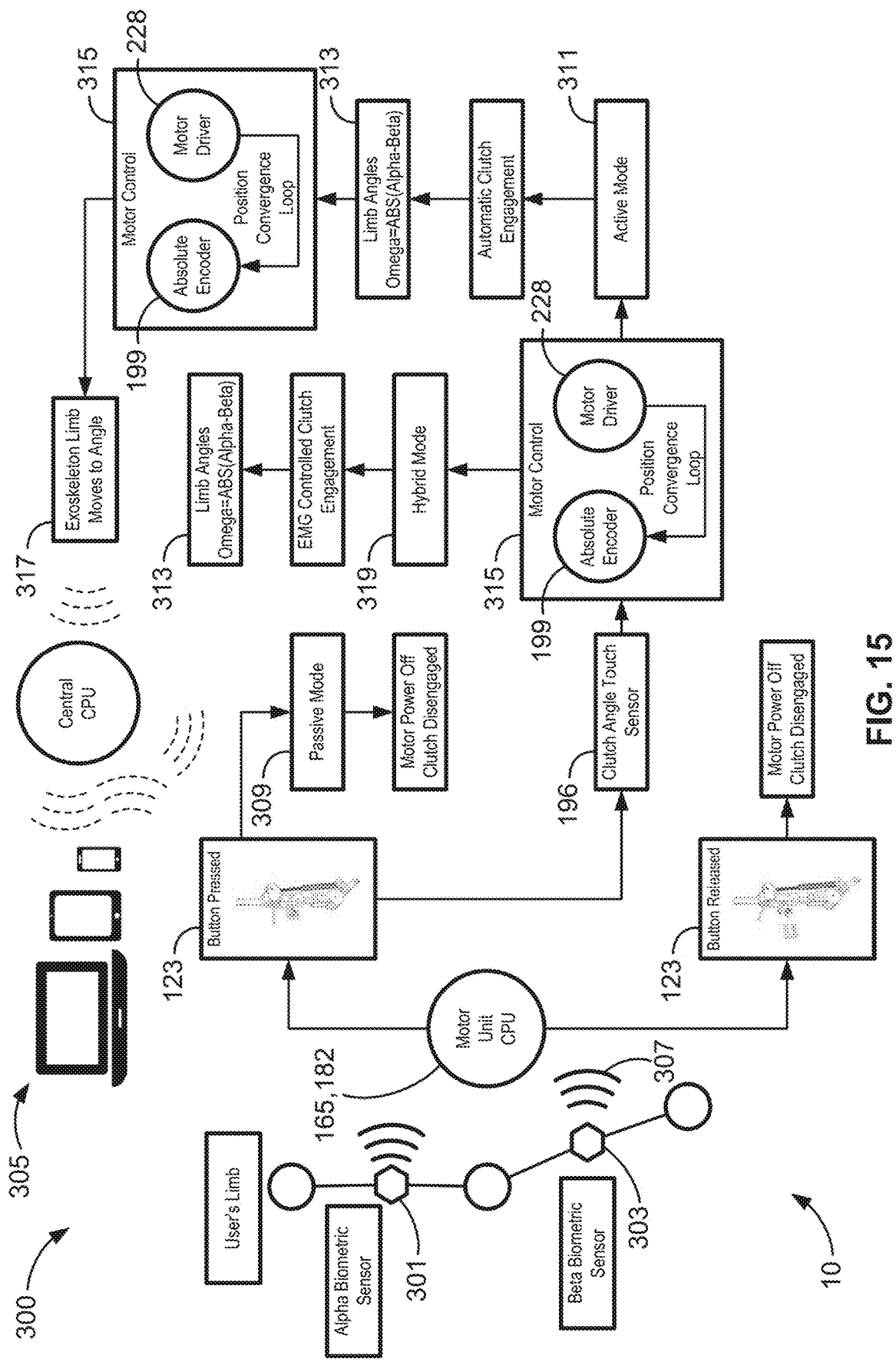
FIG. 15 is a schematic system diagram displaying a representative wireless biometric sensor to motor unit and motor-clutch control to central device connection method in accord with aspects of this disclosure.

FIG. 15 provides a diagrammatic illustration of a representative wireless biometric sensor array and exoskeleton control system and method for automated hybrid motor unit motor-clutch control, collectively designated as 300. In this example, an alpha biometric sensor or sensors 301 and a beta biometric sensor or sensors 303 collect biometric measurements from a user wearing the exoskeleton system 10 of FIGS. 1 and 2. These sensors 301, 303 send data via wireless communication to one or more of the motor unit CPUs 165, 182. Using a smartphone, tablet computer, or other wireless-enabled personal computing device, app, or interface (collectively designated 305 in FIG. 15), a user may input a desired operating mode (active/passive) that will be enabled when the motor-clutch button switch 123 is pressed. If a passive (disengaged) operating mode 309 is selected, the motor 184 and clutch 191 may be powered off or remain off and the clutch 191 may be disengaged of remain disengaged. This passive operating mode may allow the user to freely move around with limited or no assistance from the motor 184. If an active (engaged) operating mode 311 is selected, the motor 184 and clutch 191 may be powered on and the clutch angle touch sensor 196 will be used as an input for automated alignment and control of the motor unit 184. Then the clutch 191 is engaged, the alpha and beta biometric sensors 301, 303 may output (advertise) wireless angle data.

When one or more of the motor unit CPUs 165, 182 subscribes to the wireless transmission of sensor data from one or more of the biometric sensors 301, 303, e.g., as indicated at process block 307, it may responsively calculate a limb joint angle omega, as indicated at process block 313:

$$\text{Omega} = |\text{alpha} - \text{beta}|$$

After the calculation of omega, the motor unit CPUs 165, 182 use the limb joint angle as an input for motor control at process block 315. The absolute encoder 199 may then determine a real-time or near real-time angular position of the motor 184; the motor unit CPU 165, 182 may responsively transmit command signals to the motor driver 159, 222 to move the motor 145, 167 in a direction corresponding to where is the omega set point. This process may systematically repeat until a position convergence is achieved. A result may include the real-time movement of the exoskeleton limb to assist the user's action. At process block 317, an output movement signal may then be sent via wireless transmission to the Central CPU for processing; corresponding data may be sent via wireless transmission to an IoT device or a smartphone, tablet computer, or computer app for data display and logging. If the user selects hybrid mode at process block 319, the clutch angle touch sensor 196 angle may be used as an input for continuous motor control as if the motor is following the clutch position. When an EMG threshold on the biometric sensors is reached, the clutch may engage and the active mode process described may be executed. If the motor-cutch button is released, the motor 184 may be powered off and/or the clutch 191 disengaged; at this juncture, a joint and appendage assembly may be locked in place.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the disclosure expressly includes any and all combinations and subcombinations of the preceding elements and features.

What is claimed:

1. A motor unit for an exoskeleton system having an exoskeleton frame including an articulating joint and appendage (J&A) unit with a joint assembly, the J&A unit configured to attach to an appendage of a user, the motor unit comprising:
   a motor support structure including a motor plate configured to attach to the J&A unit;
   an electric motor attached to the motor support structure and operable to produce a motor output torque;

a motor attachment device selectively connectable to the electric motor and configured to drivingly connect to the joint assembly and thereby transmit thereto the motor output torque received from the electric motor;

an electromagnetic (EM) clutch assembly attached to the motor support structure in serial power-flow communication between the electric motor and the motor attachment device, the EM clutch assembly being selectively actuable to drivingly connect the electric motor to the motor attachment device and thereby transmit the motor output torque to the joint assembly; and a motor unit housing attached to the motor support structure and containing therein the EM clutch assembly.

2. The motor unit of claim 1, wherein the EM clutch assembly includes an EM clutch rotor and an EM clutch hub coaxial with and reciprocally translatable towards and away from the EM clutch rotor, and wherein the EM clutch rotor is drivingly connected to the electric motor, and the EM clutch hub is drivingly connected to the motor attachment device.

3. The motor unit of claim 2, wherein the EM clutch assembly further includes an EM clutch coil configured to generate, in response to receiving an electric current, an electromagnetic field that causes the EM clutch hub to translate towards the EM clutch rotor.

4. The motor unit of claim 2, wherein the EM clutch rotor includes a first set of axially projecting gear teeth, and the EM clutch hub includes a second set of axially projecting gear teeth that intermeshes with the first set of axially projecting gear teeth upon actuation of the EM clutch assembly.

5. The motor unit of claim 2, wherein the EM clutch rotor and the EM clutch hub of the EM clutch assembly rotate on a first axis, and a motor shaft of the electric motor rotates on a second axis spaced from and substantially parallel to the first axis.

6. The motor unit of claim 1, further comprising a driven gear drivingly connected to the electric motor, and an idler gear drivingly connected to the EM clutch assembly and meshingly engaged with the driven gear in serial power-flow communication between the electric motor and the EM clutch assembly.

7. The motor unit of claim 6, wherein the idler gear is fixedly attached to an EM clutch rotor of the EM clutch assembly to coaxially rotate in unison therewith on a first axis, and the driven gear is rotatably attached to a motor shaft of the electric motor to coaxially rotate in unison therewith on a second axis spaced from and substantially parallel to the first axis.

8. The motor unit of claim 1, further comprising a harmonic drive unit drivingly connected to the electric motor in serial power-flow communication between the electric motor and the EM clutch assembly, the harmonic drive unit being operable to modify the motor output torque of the electric motor.

9. The motor unit of claim 8, further comprising:
a first gear drivingly connected to the harmonic drive unit;
a second gear rotatably attached to the motor support structure and meshingly engaged with the first gear; and
a rotational position encoder operatively connected to the second gear and operable to determine therefrom a rotational position of the electric motor.

10. The motor unit of claim 9, wherein the electric motor is directly drivingly connected to the harmonic drive unit, the harmonic drive unit is directly drivingly connected to the first gear, the first gear is directly drivingly connected to a gear spacer, and the gear spacer is directly drivingly connected to a driven gear connected to the EM clutch assembly via an idler gear.

11. The motor unit of claim 1, wherein the motor plate of the motor support structure is a first motor plate rigidly attached to a second motor plate, the first motor plate being configured to mount onto the joint assembly, and the second motor plate mounting thereon the electric motor and the EM clutch assembly.

12. The motor unit of claim 11, wherein the motor support structure further includes a third motor plate interposed between and rigidly attaching the first motor plate to the second motor plate such that the first and second motor plates are substantially parallel to each other and substantially orthogonal to the third motor plate.

13. The motor unit of claim 12, further comprising a first L-shaped rail and a second L-shaped rail each having a respective first end rigidly attached to and abutting the first motor plate and a respective second end rigidly attached to the second motor plate.

14. An exoskeleton system comprising:
an exoskeleton frame including an articulating joint and appendage (J&A) unit with a joint assembly, the J&A unit configured to attach to an appendage of a user; and
a motor unit including:
a motor support structure including a motor plate removably mounted to the J&A unit;
an electric motor mounted to the motor support structure and operable to produce a motor output torque;
a motor attachment device selectively connectable to the electric motor and drivingly connected to the joint assembly to transmit thereto the motor output torque received from the electric motor;
an electromagnetic (EM) clutch assembly mounted to the motor support structure in serial power-flow communication between the electric motor and the motor attachment device, the EM clutch assembly being selectively actuable to drivingly connect the electric motor to the motor attachment device and thereby transmit the motor output torque to the joint assembly; and
a motor unit housing attached to the motor support structure and containing therein the EM clutch assembly.

15. A method of assembling a motor unit for an exoskeleton system, the exoskeleton system having an exoskeleton frame including an articulating joint and appendage (J&A) unit with a joint assembly, the J&A unit configured to attach to an appendage of a user, the method comprising:
assembling a motor support structure including a motor plate configured to mount to the joint assembly;
attaching an electric motor to the motor support structure, the electric motor being operable to produce a motor output torque;
attaching, in a selectively connectable manner, a motor attachment device to the electric motor, the motor attachment device being configured to drivingly connect to the joint assembly and transmit thereto the motor output torque received from the electric motor;
attaching an electromagnetic (EM) clutch assembly to the motor support structure in serial power-flow communication between the electric motor and the motor attachment device, the EM clutch assembly being selectively actuable to drivingly connect the electric motor to the motor attachment device and thereby transmit the motor output torque to the joint assembly; and attaching a motor unit housing to the motor support structure such that the motor unit housing contains therein the EM clutch assembly.

16. The method of claim 15, wherein the EM clutch assembly includes an EM clutch hub coaxial with and reciprocally translatable towards and away from an EM clutch rotor, and wherein the EM clutch rotor is drivingly connected to the electric motor, and the EM clutch hub is drivingly connected to the motor attachment device.

17. The method of claim 16, wherein the EM clutch assembly further includes an EM clutch coil configured to generate, in response to receiving an electric current, an electromagnetic field that causes the EM clutch hub to translate towards the EM clutch rotor.

18. The method of claim 17, wherein the EM clutch rotor includes a first set of axially projecting gear teeth, and the EM clutch hub includes a second set of axially projecting gear teeth that intermeshes with the first set of axially projecting gear teeth upon actuation of the EM clutch assembly.

19. The method of claim 18, wherein the EM clutch rotor and the EM clutch hub of the EM clutch assembly rotate on a first axis, and a motor shaft of the electric motor rotates on a second axis spaced from and substantially parallel to the first axis.

20. The method of claim 15, further comprising drivingly connecting a harmonic drive unit to the electric motor in serial power-flow communication between the electric motor and the EM clutch assembly, the harmonic drive unit being operable to modify the motor output torque of the electric motor.

* * * * *